United States Patent
Nagata et al.

(10) Patent No.: US 6,701,017 B1
(45) Date of Patent: Mar. 2, 2004

(54) HIGH RESOLUTION HIGH-VALUE ADDED VIDEO TRANSFER METHOD SYSTEM AND STORAGE MEDIUM BY USING PSEUDO NATURAL IMAGE

(75) Inventors: Masahiro Nagata, Hamamatsu (JP); Suguru Yoshioka, Hamamatsu (JP)

(73) Assignee: Nihon Computer Co., Ltd. (JP)

( * ) Notice: Subject to any disclaimer, the term of this patent is extended or adjusted under 35 U.S.C. 154(b) by 0 days.

(21) Appl. No.: 09/402,852

(22) PCT Filed: Feb. 10, 1999

(86) PCT No.: PCT/JP99/00593

§ 371 (c)(1),
(2), (4) Date: Jan. 14, 2000

(87) PCT Pub. No.: WO99/40725

PCT Pub. Date: Aug. 12, 1999

(30) Foreign Application Priority Data

Feb. 10, 1998 (JP) .......................................... 10-028538

(51) Int. Cl.[7] .................................................. G06K 9/36
(52) U.S. Cl. ........................ 382/232; 382/282; 348/265
(58) Field of Search ................................. 382/232, 269, 382/112, 282; 348/265; 250/559.44

(56) References Cited

U.S. PATENT DOCUMENTS

| 4,771,471 A | * | 9/1988 | Kitamura | 382/41 |
| 4,885,785 A | * | 12/1989 | Reynolds et al. | 382/8 |
| 5,500,654 A | * | 3/1996 | Fujimoto | 345/132 |
| 5,511,148 A | * | 4/1996 | Wellner | 395/106 |
| 5,519,402 A | * | 5/1996 | Kitayoshi | 342/196 |

FOREIGN PATENT DOCUMENTS

| JP | 7-162852 | | 6/1995 | ............ H04N/7/24 |
| JP | 410074252 A | * | 3/1998 | ............ G06T/1/00 |

* cited by examiner

*Primary Examiner*—Anh Hong Do
(74) *Attorney, Agent, or Firm*—Harness, Dickey & Pierce, P.L.C.

(57) ABSTRACT

There are provided a window setting means for setting a window in a high resolution picture, the window being smaller than the picture; a window moving means for moving the window set by the window setting means at such a predetermined interval that an area in which the window and at least an adjacent window overlap each other exists; an image cutout means for cutting out an image of an area defined by the window, whenever the window is moved; and a picture generation means for generating a large picture by conducting dynamic image processing on images cut out by the image cutout means. By generating an artificial dynamic image, it is made possible to handle a high resolution dynamic picture having a wide area which can be handled almost as a still picture and a frequently changing area, as a dynamic image.

22 Claims, 14 Drawing Sheets

HIGH RESOLUTION HIGH-VALUE ADDED VIDEO TRANSFER METHOD SYSTEM AND STORAGE MEDIUM BY USING PSEUDO NATURAL IMAGE

TECHNICAL FIELD

The present invention is suitable to a high resolution high value added video transfer method using artificial natural Images, a high resolution high value added video processing apparatus, a high resolution high value added video processing method, a high resolution high value added video transfer system, and a storage medium, and in particular to a video transfer apparatus utilizing a dynamic image compression and expansion method.

BACKGROUND OF THE INVENTION

When transmitting or storing image data, the amount of image data which can be treated as one picture is uniquely determined. When transmitting or storing a large image (high resolution image), therefore, image data forming the above described large image is cut out as image data of a treatable size, the resolution was lowered by thinning, or the image data is divided into a plurality of tile patterns before being transmitted or stored.

If image data forming the large image is cut out or the resolution is lowered, the picture quality is significantly hampered. In the case where a high resolution picture is divided into a plurality of tile patterns and transmitted by using respectively different transmission, it is necessary to ensure paths of a plurality of pictures forming one high resolution picture. Furthermore, since synchronization between a plurality of pictures is required, the apparatus scale is enlarged and implementation is difficult. Furthermore, since a high resolution picture is divided into a plurality of tile patterns and transmission is conducted by using a single transmission path, the transmission path is required to bear an excessive heavy load and there is a problem in arrival time of data of one picture.

The dynamic image compression and expansion method is standardized as standards. A method which will have a higher efficiency (such as achievement of a higher compression factor) in the future is adopted. In the field of stored media and communication, an environment of utilization is being put in good condition.

In the dynamic image compression and expansion method thus standardized and put to practical use widely, natural video images (movie and television video images) are subjected to compression and expansion which do not give a sense of incompatibility in human eyesight. The compression factor is thus increased. As a result, the amount of data to be transmitted and received or stored in a storage medium is significantly reduced.

However, direct application of the dynamic image compression and expansion method standardized and put in good condition of the utilization environment to a large image (high resolution image) such as a picture on a computer, a presentation picture, a security picture, or a television conference picture which is such a dynamic image that there is little change in most areas whereas a narrow area frequently changes is limited by resolution. In the case where a high resolution picture is divided into a plurality of tile patterns and the above described dynamic image compression method is applied successively to pictures resulting from the division as in the conventional technique, there is no correlation at all between pictures resulting from the division, and consequently the original merit of the dynamic image compression method (i.e., realization of highly efficient compression by using correlation between pictures) cannot be obtained. As a result, a high resolution picture cannot be transferred or stored efficiently.

In view of the above described problems, an object of the present invention is to make it possible to efficiently transfer or store video images each having a larger size than a standardized video size, by making the most of the utilization environment of the dynamic image compression and expansion standardized and put to practical use.

DISCLOSURE OF THE INVENTION

A high resolution high value added video processing apparatus of the present invention is characterized in that the high resolution high value added video processing apparatus includes: a window setting means for setting a window in a high resolution picture, the window being smaller than the picture; a window moving means for moving the window set by the window setting means at such a predetermined interval that an area in which the window and at least an adjacent window overlap each other exists; an image cutout means for cutting out an image of an area defined by the window, whenever the window is moved; and a picture generation means for generating a large picture by conducting dynamic image processing on images cut out by the image cutout means.

In accordance with another feature of a high resolution high value added video processing apparatus of the present invention, a high resolution high value added video processing apparatus for cutting out an image of an area defined by a window from a high resolution picture, and conducting dynamic image compression, transfer and expansion on the cut out image is characterized in that the high resolution high value added video processing apparatus includes: a window moving means for moving the window at such a predetermined interval that an area in which the window and at least an adjacent window overlap each other exists; an image cutout means for cutting out an image of an area defined by the window, in a position whereto the window has moved; a picture generation means for generating a large picture by conducting dynamic image processing on images cut out by the image cutout means; a changed portion detection means for detecting a changed portion included in the high resolution picture; a window moving means for moving the window to a changed portion included in the high resolution picture and detected by the changed portion detection means; and a moving control means for exercising control so as to cause the movement of the window to become movement over whole picture area, when a changed portion has not been detected in the high resolution picture by the changed portion detection means.

In accordance with another feature of a high resolution high value added video processing apparatus of the present invention, the high resolution high value added video processing apparatus is characterized in that the changed portion detection means detects a changed portion by extracting a parameter linked to a picture change as regards an overlap area of adjacent windows.

A high resolution high value added video processing method of the present invention is characterized in that the high resolution high value added video processing method includes: window setting processing for setting a window in a high resolution picture, the window being smaller than the picture; window moving processing for moving the window set by the window setting processing at such a predetermined interval that an area in which the window and at least an adjacent window overlap each other exists; image cutout processing for cutting out an image of an area defined by the window, whenever the window is moved; and picture generation processing for generating a large picture by conducting dynamic image processing on images cut out by the image cutout processing.

In accordance with another feature of a high resolution high value added video processing method of the present invention, a high resolution high value added video processing method for cutting out an image of an area defined by a window from a high resolution picture, and conducting dynamic image compression, transfer and expansion on the cut out image is characterized in that the high resolution high value added video processing method includes: window moving processing for moving the window at such a predetermined interval that an area in which the window and at least an adjacent window overlap each other exists; image cutout processing for cutting out an image of an area defined by the window, in a position whereto the window has moved; picture generation processing for generating a large picture by conducting dynamic image processing on images cut out by the image cutout processing; changed portion detection processing for detecting a changed portion included in the high resolution picture; window moving processing for moving the window to a changed portion included in the high resolution picture and detected by the changed portion detection processing; and moving control processing for exercising control so as to cause the movement of the window to become movement over whole picture area, when a changed portion has not been detected in the high resolution picture by the changed portion detection processing.

In accordance with another feature of a high resolution high value added video processing method of the present invention, the high resolution high value added video processing method is characterized in that the changed portion detection processing is conducted by extracting a parameter linked to a picture change as regards an overlap area between adjacent windows.

A high resolution high value added video transfer system of the present invention is characterized in that in the high resolution high value added video transfer system for cutting out an image of an area defined by a window from a high resolution picture, and conducting dynamic image compression, transfer and expansion on the cut out image, a transmission side includes: a window moving means for moving the window at such a predetermined interval that an area in which the window and at least an adjacent window overlap each other exists; an image cutout means for cutting out an image of an area defined by the window, in a position whereto the window has moved; a picture generation means for generating a large picture by conducting dynamic image processing on images cut out by the image cutout means; a changed portion detection means for detecting a changed portion included in the high resolution picture; a window moving means for moving the window to a changed portion included in the high resolution picture and detected by the changed portion detection means; and a moving control means for exercising control so as to cause the movement of the window to become movement over whole picture area, when a changed portion has not been detected in the high resolution picture by the changed portion detection means, and a reception side includes a picture reconstruction means for receiving and expanding a compressed result of an image of a whole picture area cut out in a window movement position and reconstructing it as a high resolution picture in case the reception side has a high resolution picture display means, and for receiving and expanding a compressed result of an image of a window area obtained by cutting out a partial changed area in the picture or a specified window area in the picture and reconstructing it as a standard resolution picture in case the reception side has only a standard resolution picture display means.

In accordance with another feature of a high resolution high value added video transfer system of the present invention, the high resolution high value added video transfer system is characterized in that when moving the window over the whole picture area of the high resolution picture and cutting out an image in the window area, a pattern of the window movement is fixedly defined.

In accordance with another feature of a high resolution high value added video transfer system of the present invention, the high resolution high value added video transfer system is characterized in that with an overlap portion of an image within each window area cut out by moving the window on the high resolution picture while causing overlap, control information containing at least position information of the cutout window, and cryptograph information are combined, and the control information and the cryptograph information are made unrecognizable in human eyesight.

In accordance with another feature of a high resolution high value added video transfer system of the present invention, the high resolution high value added video transfer system is characterized in that the transmission side includes: a first compression and transfer means for cutting out images of areas defined by the window corresponding to the whole picture area, generating an artificial dynamic image, and compressing and transferring the artificial dynamic image; and a second compression and transfer means for defining and cutting out only a changed portion in the high resolution picture by using the window, generating an artificial dynamic image, and compressing and transferring the artificial dynamic image, and the reception side includes: a high resolution picture generation means for receiving and expanding high resolution picture data corresponding to the whole picture area transferred from the first compression and transfer means and generating a high resolution picture; a storage means for holding high resolution picture data generated by the high resolution picture generation means; and an image data update means for replacing image data of a corresponding portion in image data stored in the storage means with image data of a changed portion in the high resolution picture transferred from the second compression and transfer means and thus conducting update.

A high resolution high value added video transfer method of the present invention is characterized in that in a high resolution high value added video transfer method for cutting out an image of an area defined by a window from a high resolution picture, and conducting dynamic image compression, transfer and expansion on the cut out image, the transmission side conducts: window moving processing for moving the window at such a predetermined interval that an area in which the window and at least an adjacent window overlap each other exists; image cutout processing for cutting out an image of an area defined by the window, in a position whereto the window has moved; picture generation processing for generating a large picture by conducting dynamic image processing on images cutout by the image cutout processing; changed portion detection processing for detecting a changed portion included in the high resolution picture; window moving processing for moving the window to a changed portion included in the high resolution picture and detected by the changed portion detection processing; and moving control processing for exercising control so as to cause the movement of the window to become movement over whole picture area, when a changed portion has not been detected in the high resolution picture by the changed portion detection processing, and the reception side conducts picture reconstruction processing for receiving and expanding a compressed result of an image of a whole picture area cut out in a window movement position and reconstructing it as a high resolution picture in case the reception side has a high resolution picture display means, and for receiving and expanding a compressed result of an image of a window area obtained by cutting out a partial changed area in the picture or a specified window area in the picture and reconstructing it as a standard resolution picture in case the reception side has only a standard resolution picture display means.

In accordance with another feature of a high resolution high value added video transfer method of the present invention, the high resolution high value added video transfer method is characterized in that when moving the window over the whole picture area of the high resolution picture and cutting out an image in the window area, a pattern of the window movement is fixedly defined.

In accordance with another feature of a high resolution high value added video transfer method of the present invention, the high resolution high value added video transfer method is characterized in that with an overlap portion of an image within each window area cut out by moving the window on the high resolution picture while causing overlap, control information containing at least position information of the cutout window, and cryptograph information are combined, and the control information and the cryptograph information are made unrecognizable in human eyesight.

In accordance with another feature of a high resolution high value added video transfer method of the present invention, the high resolution high value added video transfer method is characterized in that the transmission side conducts: first compression and transfer processing for cutting out images of areas defined by the window corresponding to the whole picture area, generating an artificial dynamic image, and compressing and transferring the artificial dynamic image; and second compression and transfer processing for defining and cutting out only a changed portion in the high resolution picture by using the window, generating an artificial dynamic image, and compressing and transferring the artificial dynamic image, and the reception side conducts: high resolution picture generation processing for receiving and expanding high resolution picture data corresponding to the whole picture area transferred by the first compression and transfer processing and generating a high resolution picture; storage processing for holding high resolution picture data generated by the high resolution picture generation processing; and image data update processing for updating image data stored by the storage processing with image data of a changed portion in the high resolution picture transferred by the second compression and transfer processing.

In accordance with another feature of a high resolution high value added video processing apparatus of the present invention, the high resolution high value added video processing apparatus is characterized in that the high resolution high value added video processing apparatus includes: a shooting means for shooting a plurality of unit images forming a part of a large image to be formed; a control means for controlling operation of the shooting means in a panning direction and a tilt direction so that a plurality of images shot by the shooting means will respectively have overlap areas; and a picture generation means for conducting dynamic image processing on the plurality of images shot by the shooting means and generating a large picture.

In accordance with another feature of a high resolution high value added video processing method, the high resolution high value added video processing method is characterized in that the high resolution high value added video processing method includes: shooting processing for shooting a plurality of unit images forming a part of a large image to be formed; control processing for controlling operation of the shooting processing in a panning direction and a tilt direction so that a plurality of images shot by the shooting processing will respectively have overlap areas; and picture generation processing for conducting dynamic image processing on the plurality of images shot by the shooting processing and generating a large picture.

A storage medium of the present invention is characterized in that a program for causing a computer to function is stored as each of the above described means.

In accordance with another feature of a storage medium of the present invention, a storage medium is characterized in that steps included in the above described method are stored so as to be readable from a computer.

BEST MODE FOR CARRYING OUT OF THE INVENTION

First of all, the outline of the present invention will be described. The present invention aims at efficiently transferring or storing video images (hereafter referred to as high resolution pictures) each having a larger size than a video size which is the subject of the environment standardized and put in good condition of utilization facilities, by making the most of the utilization environment of the dynamic image compression and expansion standardized and put to practical use.

Figure 1:
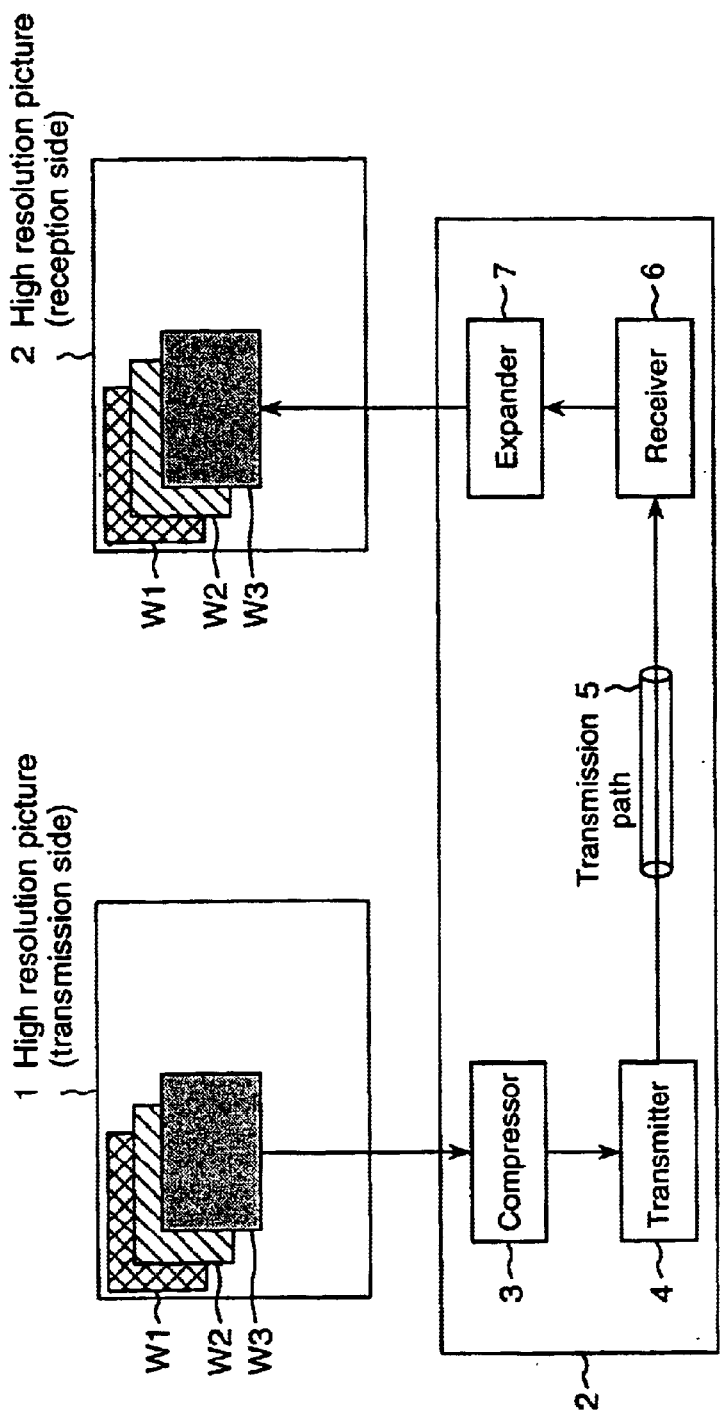
FIG. 1 is a block diagram showing a schematic configuration of an image processing apparatus according to the present invention.

FIG. 1 is a configuration diagram showing an example of a system for transferring a high resolution picture 1 according to the present invention.

As shown in FIG. 1, the high resolution picture 1 is transmitted from a transmission side to a reception size via an image transfer system 2. The image transfer system 2 includes a compressor 3, a transmitter 4, a transmission path 5, a receiver 6, and an expander 7.

The compressor 3 compresses dynamic images with a high efficiency. An arbitrary standardized image compression method can be utilized for the compressor 3. Image data compressed by the compressor 3 is converted to a transmission signal by the transmitter 4, and transmitted to the receiver 6 of a reception side via the transmission path 5. The image data received by the receiver 6 is decoded to a high resolution picture 1 by the expander 7.

In the above described image transfer system, image processing of the present invention cuts out and extracts a picture while moving a window smaller than the high resolution picture 1. And the extracted window picture is transferred via the image transfer system 2.

In the embodiments described hereafter, a graphic picture of a computer is assumed as a high resolution picture of the subject. However, the embodiments can be utilized in the same way to other utilization fields having high resolution pictures, such as presentation pictures, museum video images, medical diagnosis video images, and security video images covering a wide range.

In the present embodiment as shown in FIG. 1, a window (such as a rectangular area) prescribed (limited) in size by the compression processing and transfer is defined in cutout of windows W1, W2, W3, . . . from the high resolution picture 1.

A window is moved in the high resolution picture 1 at a defined distance interval by using the windows W1, W2, W3, . . . By arranging resultant window cutout pictures in order, an artificial dynamic image is formed.

The movement distance interval of the windows W1, W2, W3, . . . is adjusted so that adjacent windows and areas will overlap each other in a predetermined range. By compressing this artificial dynamic image according to the standardized dynamic image compression method and transferring it via a communication and transmission path, the following advantages are obtained.

In other words, if windows obtained by dividing the high resolution picture 1 into tile patterns are used in the cutout thereof, then there is no correlation between pictures of adjacent windows, and consequently they cannot help being compressed as consecutive still images. As described above, therefore, the dynamic image (natural image) compression and expansion method put to practical use widely in the field of image transfer or image storage processing cannot be utilized. As a result, it is not possible to obtain a high compression factor which is a merit of practical use of the dynamic image (natural image) compression and expansion method.

On the other hand, if cutout is conducted while moving the window as represented by W1, W2, W3, . . . as in the present embodiment, then a continuous video image (a video image akin to a natural dynamic image) are obtained as if a finder of a moved video camera is looked in. In the case of the present embodiment, therefore, a high compression efficiency is obtained by utilizing the standardized (natural) dynamic image compression and expansion method.

By compressing and transferring the high resolution picture 1 as a whole by using an artificial dynamic image (window) and then compressing and transferring only a changed portion within the high resolution picture 1 by using an artificial dynamic image (window), the amount of transfer can be reduced. On the reception side, it is not necessary to always receive the video image of the whole high resolution picture 1 in order to observe the whole high resolution picture 1, and the load can be lightened.

First Embodiment

Hereafter, a first embodiment of the present invention will be described by referring to a flow chart of FIG. 2. It is assumed that a computer picture is processed as the high resolution image in the description of the present embodiment.

Figure 2:
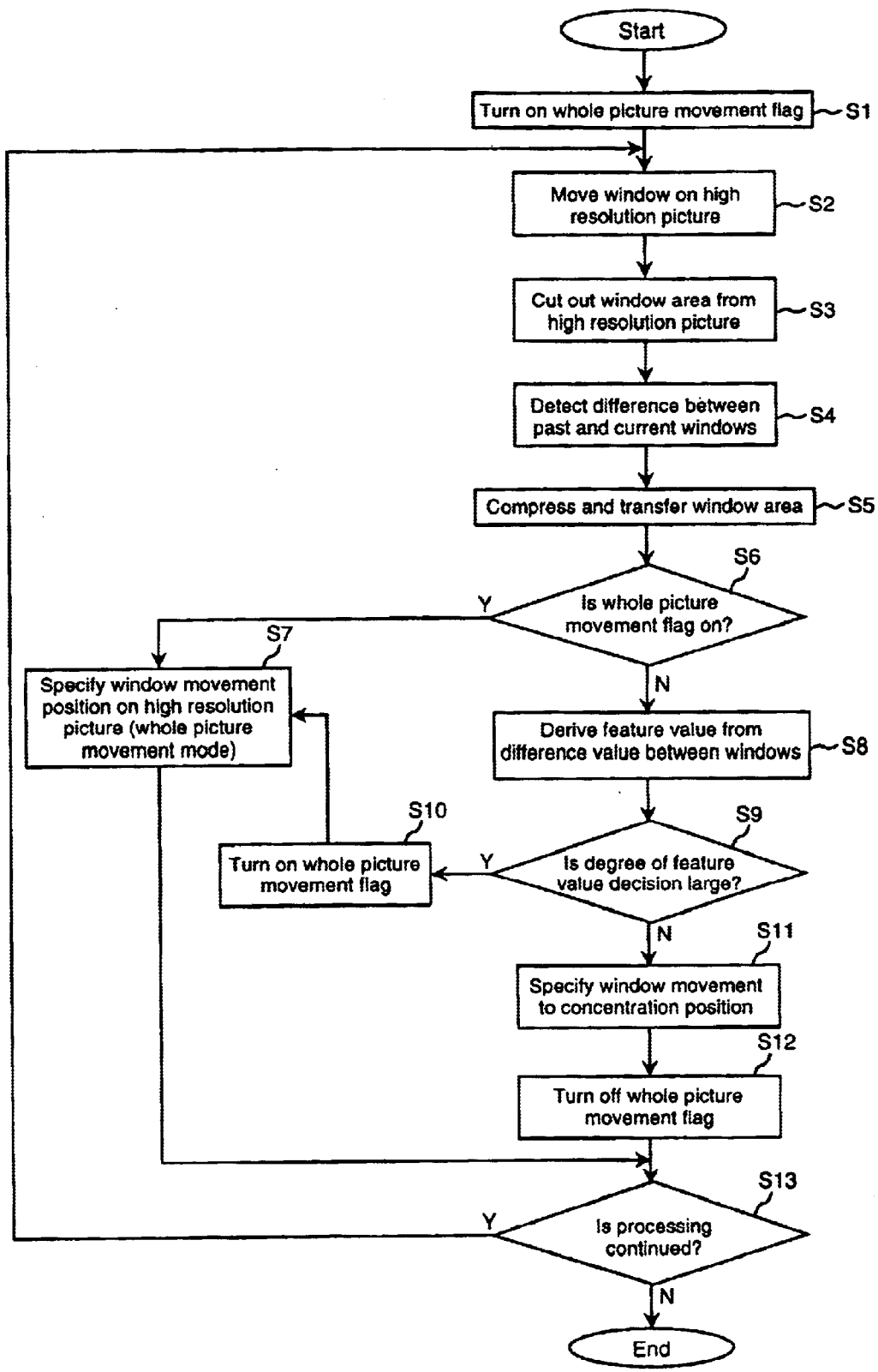
FIG. 2 is a flow chart showing a processing procedure of a first embodiment.

Upon start of processing, processing of turning on a whole picture movement flag is conducted at a first step S1 as shown in FIG. 2. Subsequently, at step S2, movement of a window in a computer picture is conducted. As for a method for moving the window, various methods can be used.

For example, as shown in FIG. 4(a), a movement method of moving the window from a left end toward a right end so that windows will overlap each other in an area of a predetermined size can be used.

When the window arrives at the right end as a result of the above described movement, the window is shifted in a vertical direction by a longitudinal dimension of the window. From the left end, the movement is started again. The window movement on the high resolution picture 1 is conducted repeatedly over the whole picture. Furthermore, as for the window movement method in the high resolution picture 1, the window may be moved so as to cause overlap in the vertical direction as well as shown in FIG. 4(b).

If the window is moved while being folded, the window pictures corresponding to the whole picture become an artificial dynamic image. As for the window movement method in the computer picture, other methods shown in FIG. 6 may be adopted. Each window movement on the picture is repeated at a defined rate (for example, at a rate of 30 times per second).

The window is moved according to the above described method. Subsequently, at step S3, the area of the moved window is cut out. Subsequently, a difference between image data contained in the window thus cut out and image data cut out in an immediately preceding window position is detected at step S4.

Figure 3:
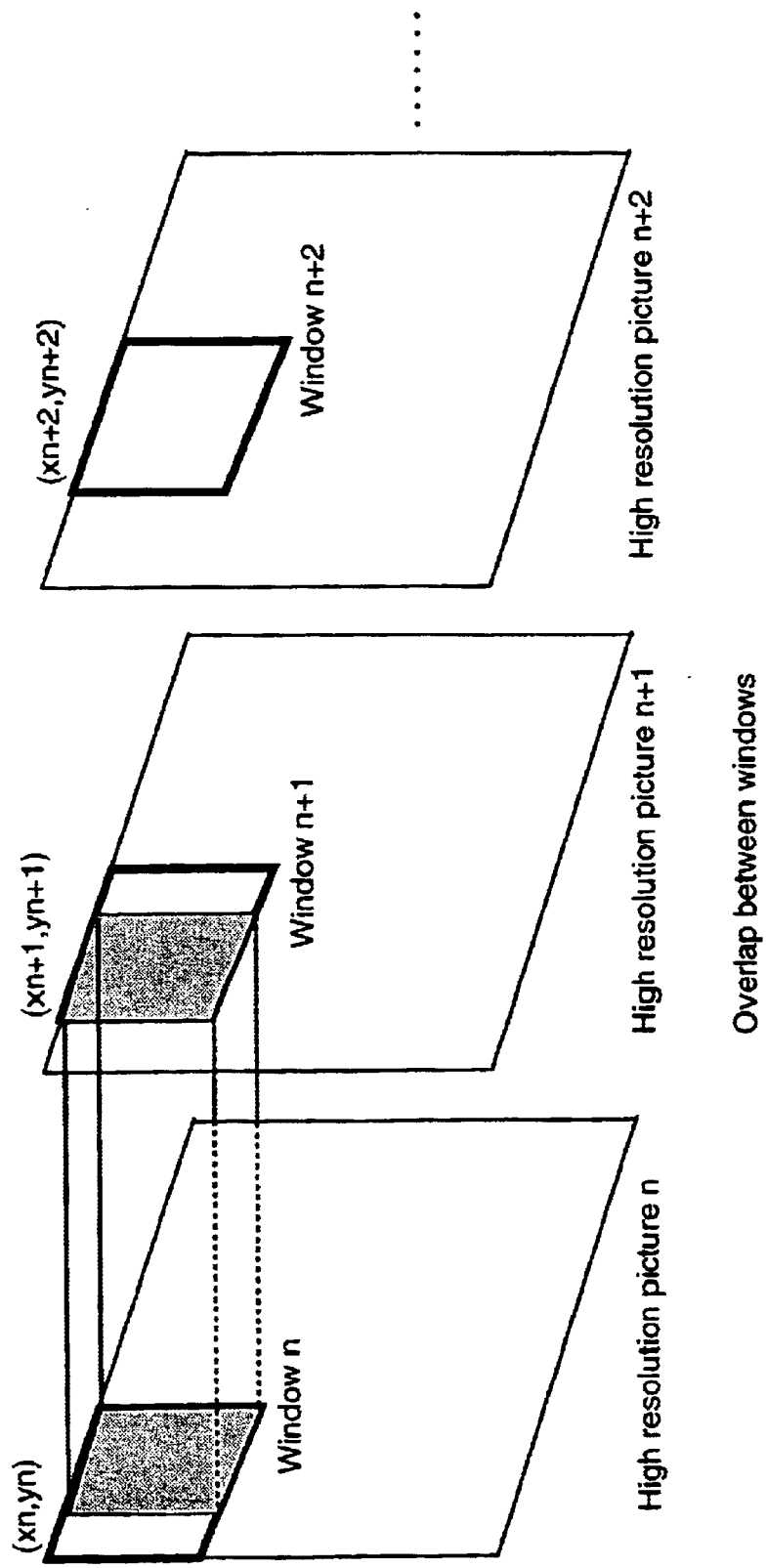
FIG. 3 is a diagram for description of overlap between windows.

The difference value thus obtained is stored in a memory for each window position. An example of a method for detecting the difference of the window between the past and the present time is shown in FIG. 3. For each of high resolution pictures n, n+1, n+2, . . . the window position is moved at a defined interval so as to cause an overlap portion as represented by shading in a window n and a window n+1.

In the difference detection method conducted at the step S4, difference processing between shaded areas of the window n and the window n+1 is effected. If there is no change in picture between the window n and the window n+1, the difference value becomes zero. If there is a change in picture between the window n and the window n+1, the difference value has a non-zero value.

Subsequently, processing proceeds to step S5, where the current image data cut out is outputted to a window area compression and transfer processing unit. Subsequently, the processing proceeds to step S6, where it is determined whether a "whole picture movement flag" is on. The "whole picture movement flag" represents whether the window movement and the whole picture processing should be executed.

If the "whole picture movement flag" is on as a result of the decision at the step S6, the processing proceeds to step S7, where a window movement position for moving the window over the whole picture is specified. Furthermore, after the window has been moved thoroughly over the whole picture, the "whole picture movement flag" is turned off. Thereafter, it is determined at step S13 whether the processing should be continued. In the case where the processing should be continued, the processing returns to the step S2, and the above described processing is conducted repeatedly.

The reason why the processing of turning on the whole picture movement flag is conducted at the step S1 is that at the beginning of the operation of the image processing apparatus a difference value of each window for searching for a changed picture portion out of the whole picture should be derived and the whole picture should be first transferred to the reception side.

On the other hand, if the "whole picture movement flag" is off as a result of decision conducted at the step S6, then a feature value is derived from the difference value of each window position held in the memory. The feature value is, for example, the centroid and variance value. In this case, a large variance value indicates that a change is occurring in a wide portion of the picture, and a small variance value indicates that a change is occurring so as to be concentrated to a local portion of the picture. Furthermore, if the sum of the difference values of all window portions is zero, it is indicated that there is no change at all in the picture.

Subsequently, the processing proceeds to step S9, where the degree of concentration of the change in the picture is determined by using the feature value obtained at the step S8. For example, in the case where the centroid and the variance value are used as the feature value, it is determined whether the variance value is large. If the variance value is large as a result of this decision, then the processing proceeds to step S10, where the "whole picture movement flag" is turned on, and then the processing proceeds to the above described step S7.

If the variance value is small as a result of the decision conducted at the step S9, the processing proceeds to step S11, where the next window position on the picture is specified to be the centroid position obtained at the step S8. Thereafter, the processing proceeds to step S12, where the "whole picture movement flag" is turned off.

In the present embodiment, the window movement over the whole picture does not occur until there is no change at all in the whole picture (the variance value becomes zero in the case where the variance value is used as the feature value) or a change occurs in a wide portion of the picture. Alternatively, the "whole picture movement flag" may be turned on periodically to effect the window movement over the whole picture at fixed time intervals.

For example, for the case where the centroid and the variance value are adopted as the feature value in the steps S8, step S9, and step S11, the centroid position $\mu x \cdot \mu y$ and the variance value $\sigma x \cdot \sigma y$ are represented by the following equations, where y·x is vertical and horizontal position information of the window over the whole picture, and d(x, y) is the difference value between windows.

$$\mu x = \Sigma x(x \times \Sigma y d(x,y))/\Sigma x \Sigma y d(x,y) \quad (1)$$

$$\mu y = \Sigma y(y \times \Sigma x d(x,y))/\Sigma x \Sigma y d(x,y) \quad (2)$$

$$\sigma x = \Sigma x((x-\mu x)^2 \times \Sigma y d(x,y))/\Sigma x \Sigma y d(x,y) \quad (3)$$

$$\sigma y = \Sigma y((y-\mu y)^2 \times \Sigma x d(x,y))/\Sigma x \Sigma y d(x,y) \quad (4)$$

For example, the case where a maximum value of the difference value between windows is adopted as the feature value of the step S8, step S9 and step S11 will now be described. First of all, a window having a maximum value in difference values between windows corresponding to the whole picture is determined. If the difference value between windows of the pertinent window (a maximum difference value) is non-zero or greater than a specified threshold value at the step S9, then the cutout window position is specified to be moved to the pertinent window position at step S11.

In the present embodiment, the picture of the held window area is one sheet of past picture. Alternatively, it is also possible to hold pictures of window areas corresponding to the whole picture, conduct difference processing between all windows every time at a defined rate (for example, 30 times per second), and update the difference value processing. However, the window for executing the compression and transfer (artificial dynamic image) is always determined to correspond to one sheet. In this case, the apparatus holds pixel data corresponding to the picture. However, the tracking performance of the case where the change portion has moved in the picture is improved.

In the case where the window is always moved over the whole picture and an area is cut out, position information for fitting a window on the reception side becomes unnecessary provided that the movement pattern is fixedly defined. In the case where the method of moving the window to the changed portion within the picture is adopted, provision of the position information for the reception side is necessary.

Figure 5:
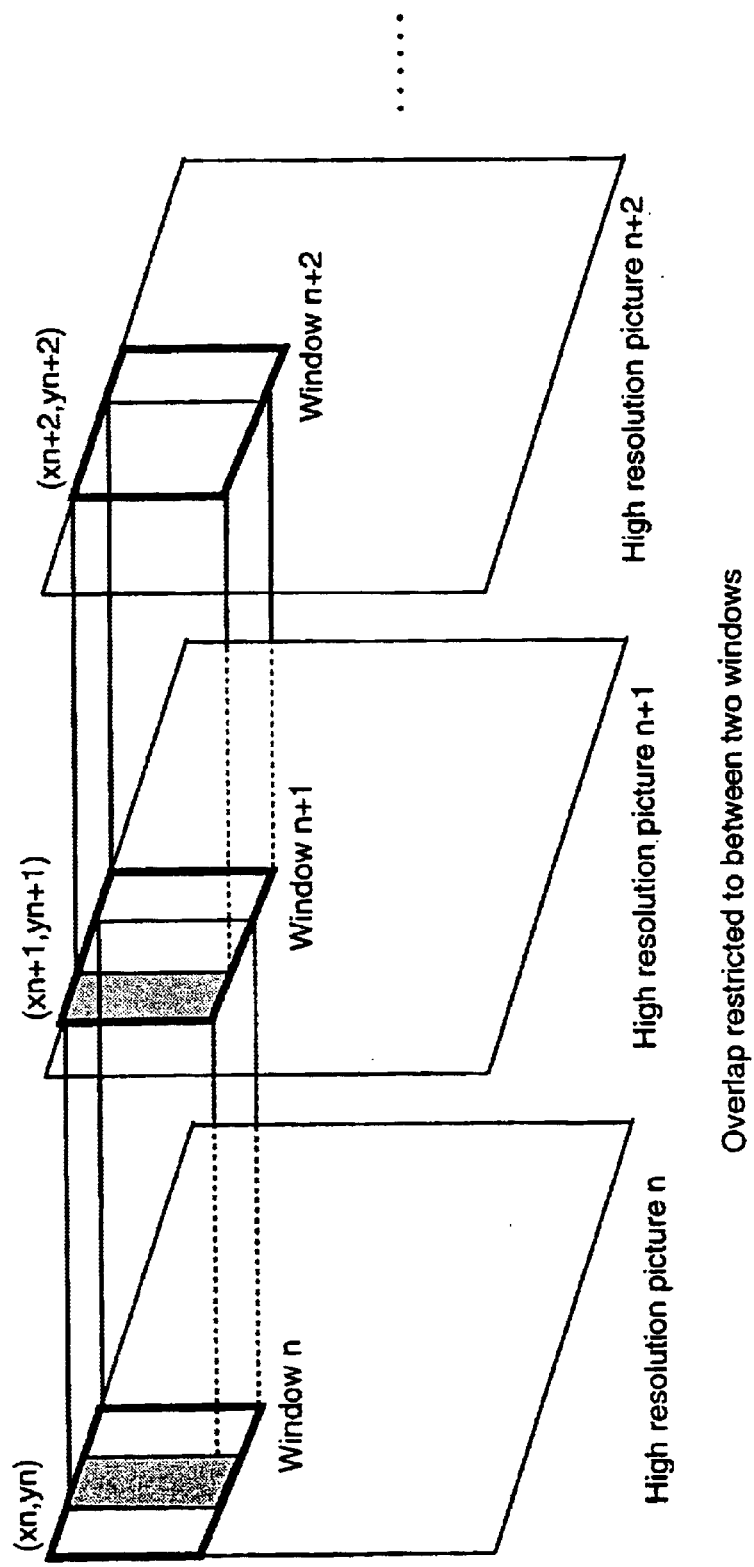
FIG. 5 is a diagram for description of overlap limited to overlap only between two windows.

As for the method for detecting the difference between the cutout image data and immediately preceding image data which has been held conducted at the step S4, a method shown in FIG. 5 may be adopted. In other words, the window position is moved at a defined interval so as to cause an overlap portion as represented by shading in a window n and a window n+1 for each of pictures (high resolution pictures 1) n, n+1, n+2, . . . .

In this difference detection method, difference processing between shaded areas of the window n and window n+1 is conducted. The overlap area represented by a shaded area limited to only between the window n and the window n+1 is an area obtained by removing the overlap of the window n+2. The difference processing between cutout windows is repeated over n=0 to N.

Figure 4:
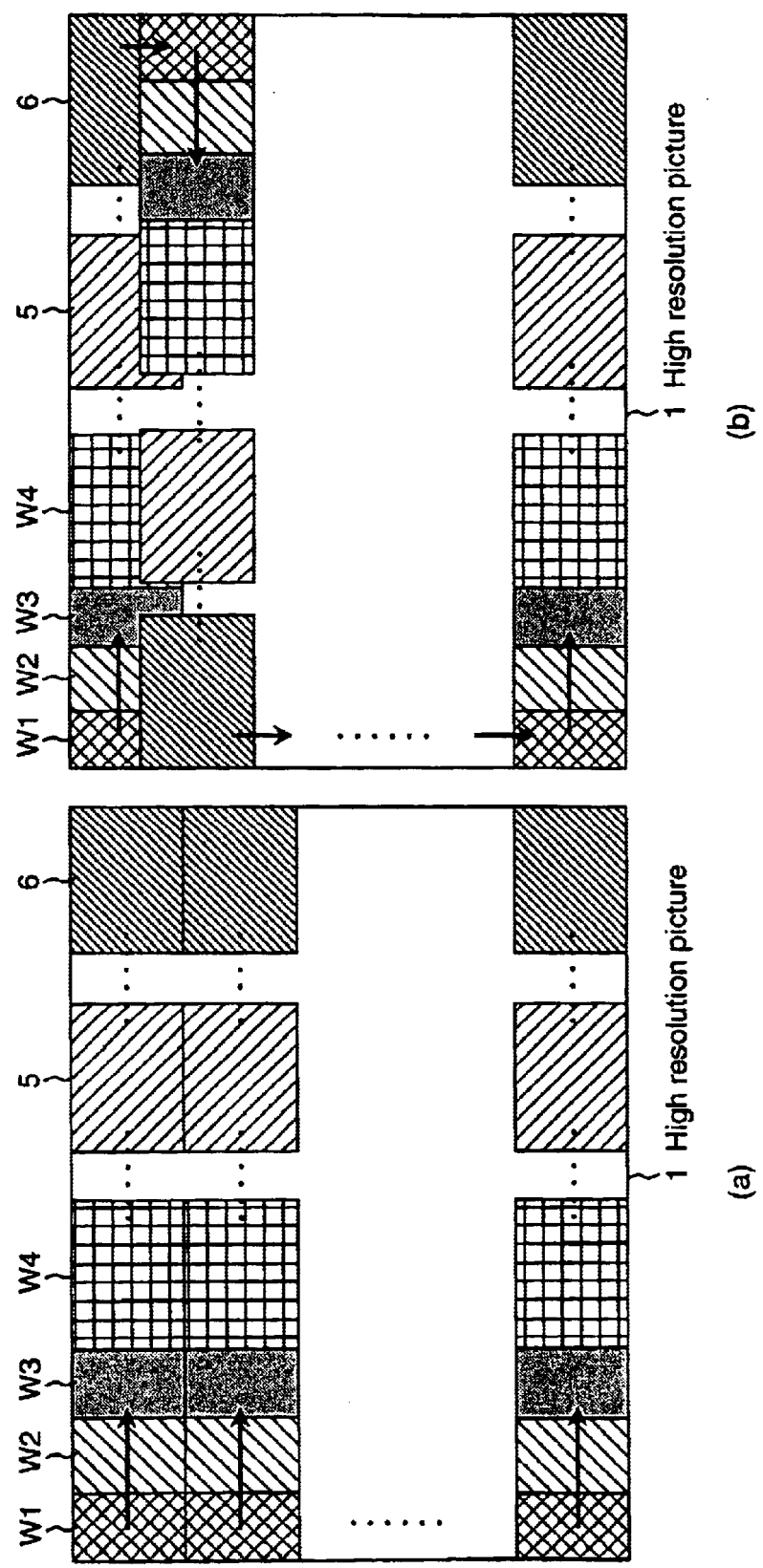
FIG. 4 is a diagram showing an example of a window moving method.
Figure 6:
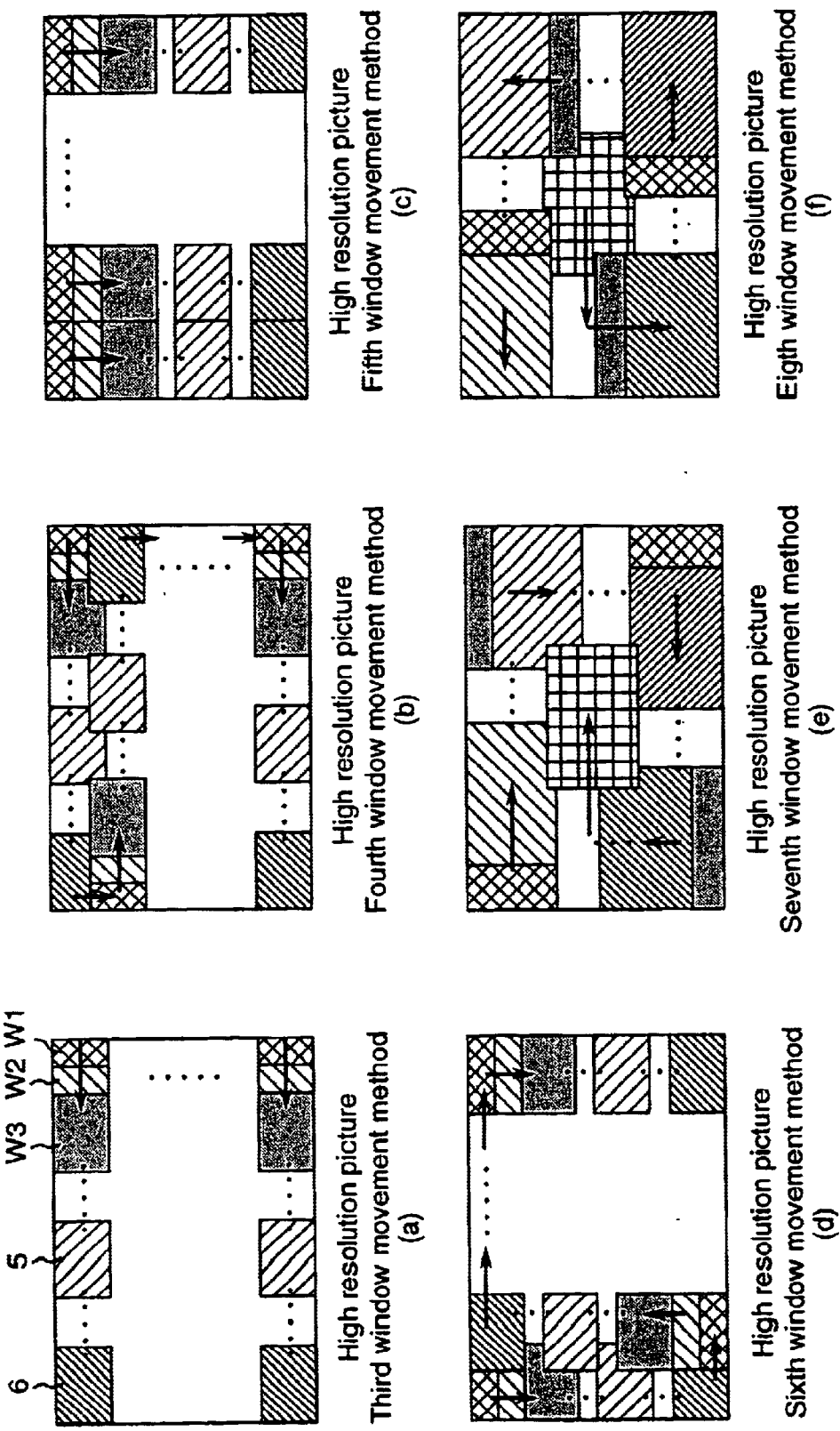
FIG. 6 is a diagram showing other examples of a window moving method.

As for the window movement in the high resolution picture 1 conducted at the step S2, the window movement method shown in FIG. 6 may be adopted in addition to the window movement method shown in FIG. 4. Whereas the movement direction shown in FIG. 4 is directed from the left end to the right end, the direction of FIGS. 6(*a*) and (*b*) is directed from the right end to the left end.

Furthermore, in FIGS. 6(*c*) and (*d*), the movement direction is directed from the horizontal direction to the vertical direction. (Although the movement direction is directed from the top end to the bottom end, it may be directed from the bottom end to the top end.) In addition, FIGS. 6(*e*) and (*f*) show window movement methods in which spiral movement is conducted.

Figure 7:
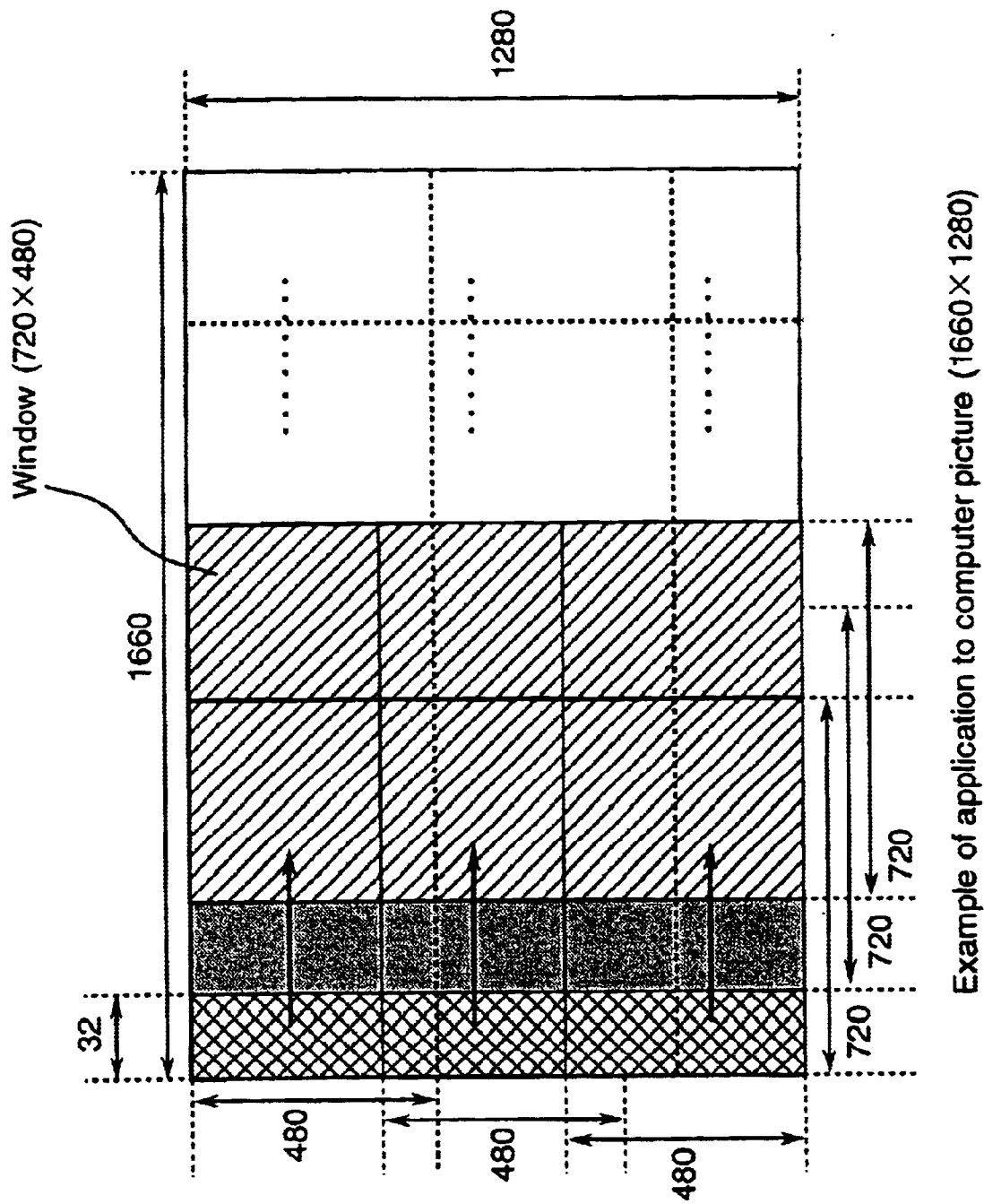
FIG. 7 is a diagram showing an example of application to a computer picture.

FIG. 7 shows the case where a computer picture having a size of 1660 by 1280 is subjected to movement and cutout by using a window having a size of 720 by 480. The movement interval of the window is set to 32 pixels. In this case, the number of times of window movement becomes 96 for the whole picture. Assuming that the defined rate is 30 sheets per rate, the time required for movement over the whole picture becomes 3.2 seconds. For reducing the time required for moving the window over the whole picture, the window size is made large, or the window movement interval is made large within such a limit that fixed areas of the window overlap each other.

Second Embodiment

Figure 8:
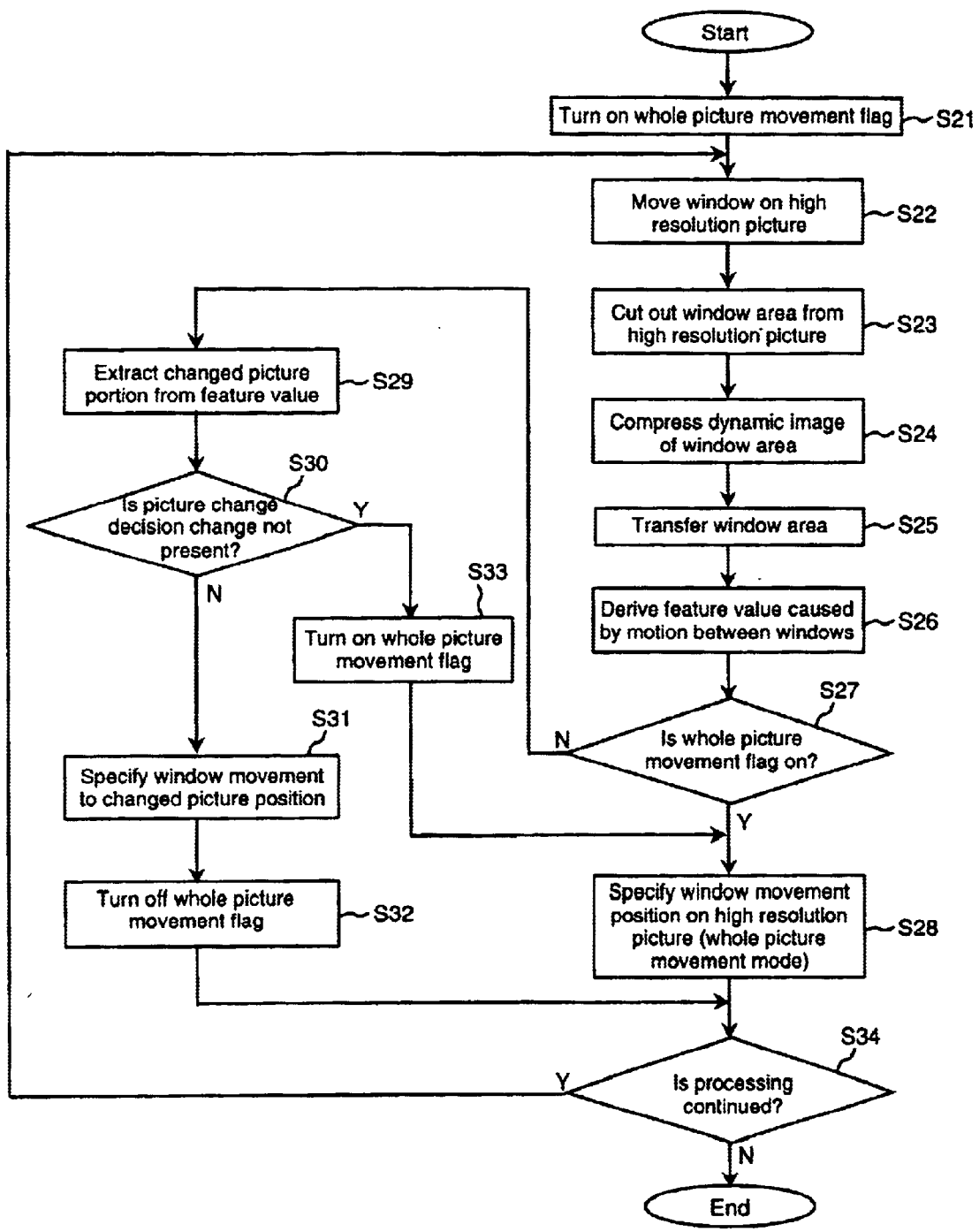
FIG. 8 is a flow chart showing a processing procedure of a second embodiment.

A second embodiment of the present invention will now be described by referring to FIG. 8.

Assuming that the high resolution picture is a computer picture as described above, the present embodiment will be described.

Upon start of processing, processing of turning on a whole picture movement flag is first conducted at step S21. Subsequently, at step S22, processing for moving the window in the computer picture is conducted. Since the processing for moving the window has been described with reference to the first embodiment, detailed description thereof will be omitted.

The movement of each window over the picture is repeated at a defined rate (for example, at a rate of 30 times per second). Subsequently, at step S23, images of areas defined by the window are cut out.

Subsequently, the processing proceeds to step S24, where the cut out image data is subjected to compression processing. As a result, parameters linked to a motion between artificial dynamic images formed by the window cut out are extracted.

Figure 9:
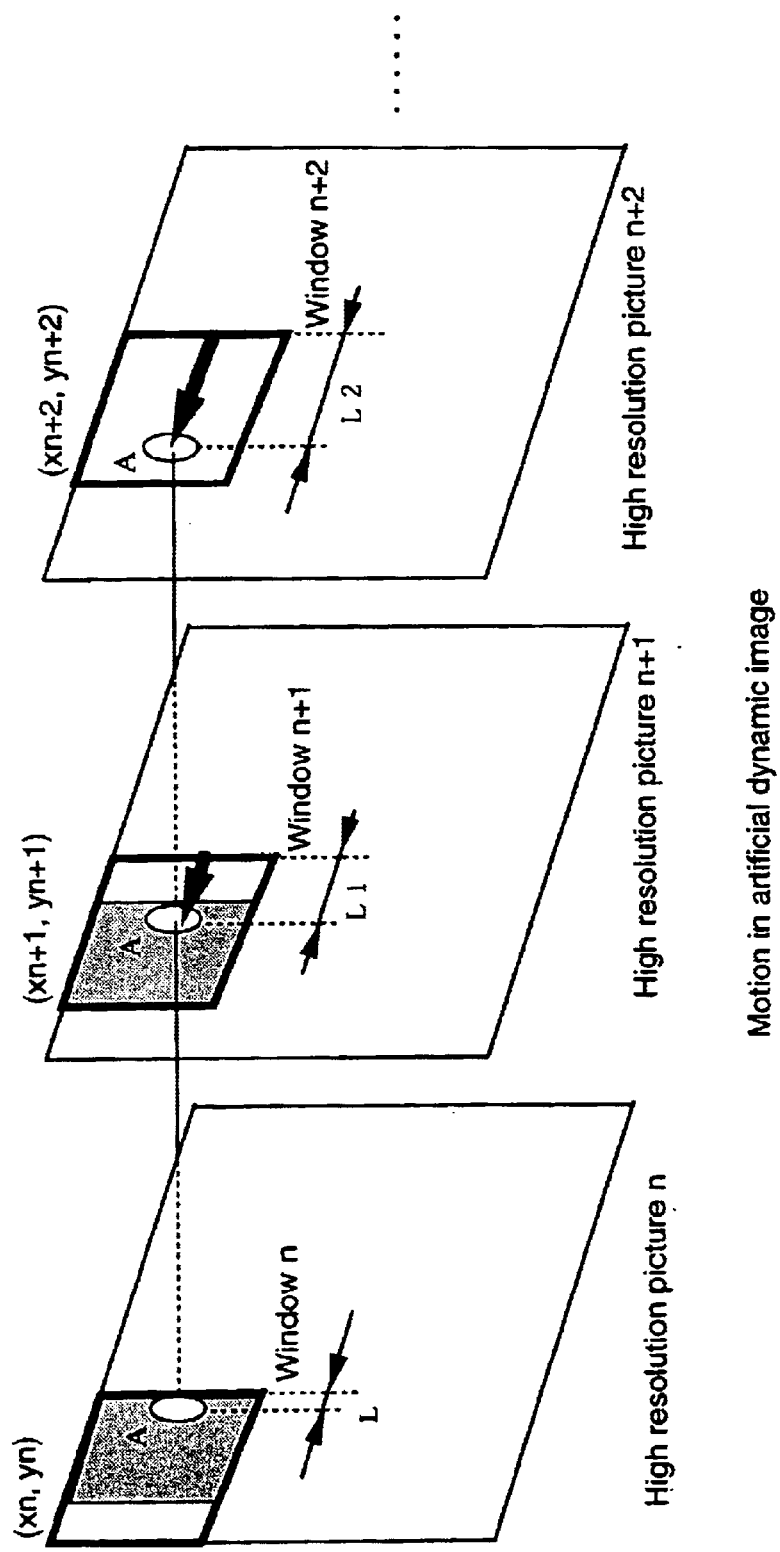
FIG. 9 is a diagram for description of a motion in an artificial dynamic image.

For each of pictures (high resolution pictures 1) n, n+1, n+2, the window position is moved at a defined interval so as to have an overlap portion as represented by shaded areas of a window n and a window n+1 in FIG. 9. A parameter linked to a motion between windows is acquired so as to be linked to a motion of, for example, an arbitrary point A as to the shaded areas of the window n and the window n+1. In the case where there is no change in the picture, the parameter linked to the motion between windows cut out (artificial dynamic images) becomes a fixed value prescribed by a direction and a value of the movement of the window.

In the case where there is a change in the picture, the parameter linked to the motion between windows cut out (artificial dynamic images) is extracted by canceling the value prescribed by the direction and the value of the movement of the window.

In the present embodiment, the window is first moved over the whole picture and processing (compression and transfer) is repeated. Thereafter, a changed portion is determined on the basis of the parameter linked to a motion. The window position is moved to the changed portion in the picture. Such a method is executed. Furthermore, if a changed portion in the pictures disappears, the window movement is returned to the initial whole picture movement. The reason why the window movement is returned to the movement over the whole picture is that a changed portion of the picture which will subsequently occur should be searched for from the whole picture.

With respect to the compression result of image data of the window area obtained at the step S24, derivation of the parameter linked to a motion between an artificial dynamic image (window) cut out in an immediately preceding window position and that cut out in the present window position is effected. The parameter linked to the motion obtained here is stored in the memory for each of window positions over the whole picture as the feature value.

The feature value (parameter linked to the motion) stored in the memory is derived with respect to a defined portion area in the window, and a known motion value caused by a window movement is canceled.

Furthermore, as for the parameter linked to a known motion caused by the window movement, it is also possible to conduct compression processing at the step S24 to lighten the motion detection processing caused by the above described compression processing.

Furthermore, when the feature value (parameter linked to a motion) is stored in the memory, update of the table holding value is not conducted, in the case where there is a significant change of movement value in window movement specification to a picture change position conducted at step S31. This is a countermeasure against the case where it has become necessary to specify such a movement value that two consecutive windows do not overlap with each other and correlation between the windows becomes weak, when moving the window position to the changed portion in the picture.

In the case where processing for specifying the window position in the picture in the whole picture movement mode (step S28) is conducted, two consecutive windows necessarily have a defined overlap portion and have correlation, and the movement interval between windows is already defined.

Since the parameter linked to the motion obtained by the window movement specification at the step S28 and the step S31 has a variance component caused by a difference of the window movement interval, the parameter is normalized and stored in the memory.

Image data of the window area subjected to the compression processing at the step S24 is then transferred via a communication and transmission path at step S25. Subsequently, at step S26, processing for deriving a feature value caused by a motion between windows is conducted.

Thereafter, the processing proceeds to step S27, where it is determined whether a "whole picture movement flag" indicating whether the window should be moved over the whole picture to conduct processing is on. If the "whole picture movement flag" is on as a result of this decision, the processing proceeds to step S28, where a window movement position for moving the window over the whole picture is derived and specified. Thereafter, it is determined at step S34 whether the processing should be continued. In the case where the processing should be continued, the processing returns to the step S22, and the above described processing is conducted repeatedly.

By the way, the reason why the processing of turning on the whole picture movement flag is first conducted at the step S21 is that at the beginning of the operation of the processing apparatus of the present embodiment a parameter (such as a direction of a motion and a motion value) linked to a motion of each window for searching for a changed picture portion out of the whole picture should be first derived and the whole picture should be first transferred to the reception side. If the whole picture has been transferred, the "whole picture movement flag" is turned off once.

On the other hand, if the "whole picture movement flag" is off as a result of decision conducted at the step S27, then the processing proceeds to step S29. At the step S29, from a feature value (parameter linked to a motion) of each window position of the whole picture held in the memory, position information of a portion where a parameter (such as a motion value) linked to the motion is maximized, and a parameter (such as a motion direction and a motion value) linked to the motion are derived.

In order to determine whether the window should be subsequently moved to the portion where the parameter (such as the motion value) linked to the motion is maximized, it is determined at step S30 whether there is a picture change on the basis of a threshold value defining the parameter (such as the motion value) linked to the motion. If the parameter (such as the motion value) linked to the motion is smaller than a defined threshold value as a result of this decision, then the processing proceeds to step S33, where the "whole picture movement flag" is turned on, and then the processing proceeds to the step S28.

On the other hand, if the parameter (such as the motion value) linked to the motion is larger than the defined threshold value as a result of the decision at the step S30, then the processing proceeds to step S31, where the next window position in the picture is specified to be the position information obtained at the step S29. Subsequently, at step S32, the "whole picture movement flag" is turned off.

In the case where the next window position in the picture is specified at step S31, the window position may be estimated and adjusted with respect to the position information obtained by the processing of the step S29, by using the parameter (such as the motion direction) linked to the motion.

In the present embodiment, the window movement over the whole picture does not occur until there is no change at all in the whole picture (for example, the motion value is zero or smaller than the threshold value) or a change occurs in a wide portion of the picture (for example, the motion value exceeds the threshold value in the whole picture). Alternatively, the "whole picture movement flag" may be turned on periodically to effect the window movement over the whole picture at fixed time intervals.

Furthermore, the parameter (such as the motion vector) linked to the motion stored for each of the windows over the whole picture may be weighted according to the position in the picture. For example, in the case where intense weighting is conducted on a central part of the picture, the central part of the picture may be updated preferentially provided that the movement values are equal.

In the case where the window is always moved over the whole picture and an area is cut out, position information for fitting a window on the reception side can be made unnecessary provided that the movement pattern is fixedly defined. In the case where the method of moving the window to the changed portion within the picture is adopted, provision of the position information for the reception side is effected.

Third Embodiment

A third embodiment of the present invention will now be described by referring to FIG. 10.

By compressing and transferring a high resolution picture as a whole by using an artificial dynamic image (implemented by moving the window while causing overlapping) and then compressing and transferring only a changed portion within the high resolution picture as a dynamic image (window), in the present embodiment method, the amount of transfer can be reduced.

On the reception side, it is not necessary to always receive the video image of the whole high resolution picture in order to observe the whole high resolution picture. The whole picture received as an artificial dynamic image at the beginning or during a defined interval is expanded. Since it is only necessary to receive and expand only a changed picture portion in most intervals, the load can be lightened. On the reception side, only a changed picture portion is expanded and updated at all times. Nevertheless, it is possible to see the whole high resolution picture (by scrolling, if necessary).

Furthermore, in the case where the window is moved on a defined track of the picture and compression and transfer are conducted by using an artificial dynamic image (window), the high resolution picture can be reconstructed on the reception side without giving and receiving the position information, by concluding an agreement of the position of the window fitted on the picture between the transmission side and the reception side. In the case where only a changed picture portion is received and expanded, the window position arbitrarily moves to the changed portion in the picture. In this case, therefore, it is necessary to receive compressed data with the position information added thereto.

In the case where the reception side has a high resolution picture, the reception side can receive and expand an artificial dynamic image (window) generated at all picture positions, and reconstruct it as a high resolution picture. In the case where the reception side has only a standard resolution picture, it is now assumed that the reception side can expand only a changed picture portion (window) and reconstruct it as a standard resolution picture.

For example, a compression format for transmission is formed so as to make a distinction between a portion for compressing and transmitting a changed portion in the picture or a specified portion in the picture, and a portion for moving the window in the whole picture and conducting compression and transmission. In the case where the reception side has a high resolution picture, both data are expanded. In the case where the reception side has only a standard resolution picture, the reception side expands only a changed picture portion or a specified picture portion.

For example, in the case where the reception side has a standard resolution picture, a compression format to be transmitted is generated so as to skip portions other than the window of a changed portion in the picture (or a specified portion in the picture) as error data at the time of expansion. The above described change of the compression format is effected on data, after the compression processing of the artificial dynamic image (window). As a result, the reception side can make the most of the utilization environment of dynamic image compression and expansion widely adopted and standardized.

Figure 10:
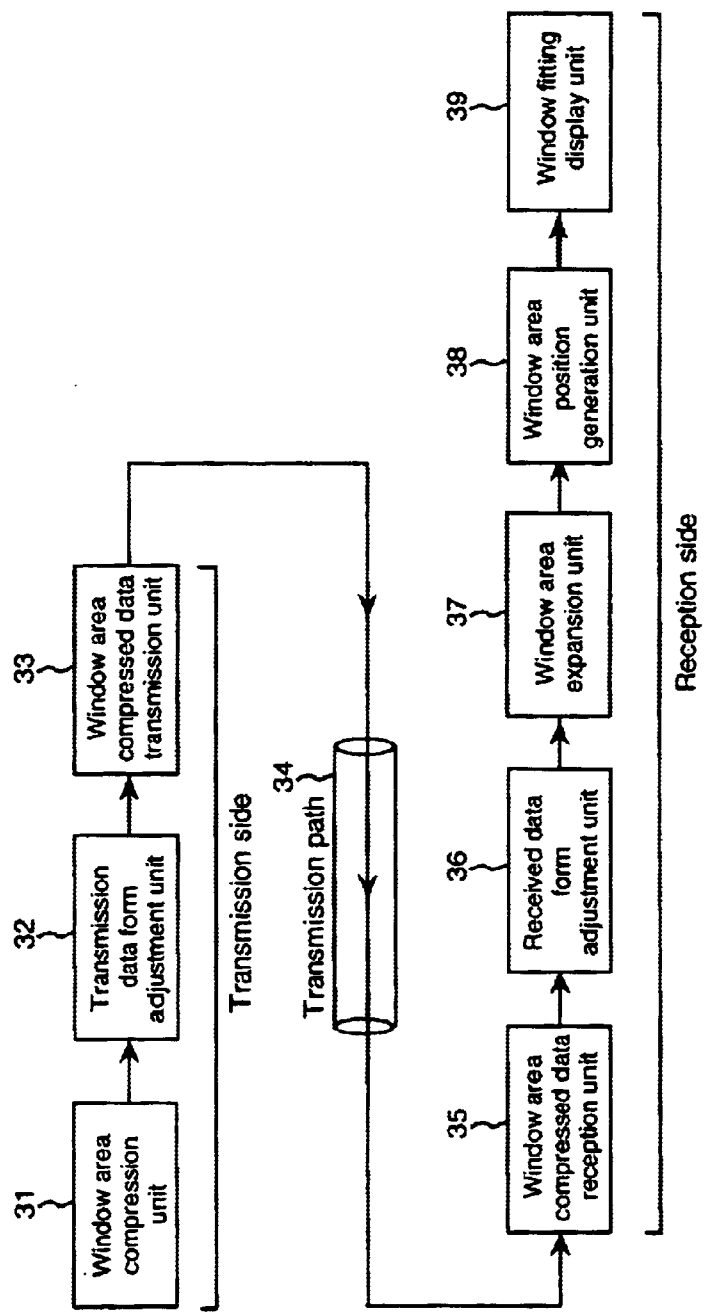
FIG. 10 is a flow chart showing a processing procedure of a third embodiment.

FIG. 10 shows a block diagram. An image processing apparatus of the present embodiment will now be described by referring to FIG. 10. A window is moved in the picture to form an artificial dynamic image, and the above described artificial dynamic image is compressed in a window area compression unit 31.

The data compressed in the above described window area compression unit 31 is supplied to a transmission data adjustment unit 32. For example, in a compression format to be transmitted, the data is formed so as to make a distinction between a portion for compressing and transmitting a changed portion in the picture or a specified portion in the picture, and a portion for moving the window in the whole picture and conducting compression and transmission.

The data adjusted in a predetermined form as described above is transmitted from a window area compressed data transmission unit 33 to the reception side via a transmission path 34.

On the receiving side, the data transmitted via the transmission path 34 is received by a window area compressed data reception unit 35, and outputted to a received data form adjustment unit 36. The received data form adjustment unit 36 is intended for adjusting the form of the window area compression data, and determines whether the picture on the reception side is a high resolution picture.

On the basis of a result of this decision, it is controlled so as to output both data to a window area expansion unit 36 (?37) in order to expand both data, or output only a changed picture portion or a specified picture portion.

For example, a form adjustment unit of window area compression data of the transmission side of the transmission data adjustment unit 32 of FIG. 10 is informed by the reception side beforehand whether the picture of the reception side is a high resolution picture. In the case where the reception side has a standard resolution picture, the window area compression unit 31 generates a compression data format to be transmitted so that the window area expansion unit 37 of the reception side will skip portions other than the window of a changed portion in the picture or a specified portion in the picture as error data at the time of expansion.

The window area expansion unit 37 expands the compressed data inputted from the received data form adjustment unit 36 as a dynamic image, and outputs the expanded data to a window area position generation unit 38.

The window area position generation unit 38 generates position information for sticking the window area expanded as a dynamic image by the window area expansion unit 37 on a picture (high resolution picture).

In the case where the transmission side moves a window in a defined track on the picture, and conducts compression and transfer by using an artificial dynamic image, a window fitting display unit 39, the reception side generates a window track moving on the picture without giving and receiving the position information, by concluding an agreement between the transmission side and the reception side beforehand, the transmission and reception procedure being thus simplified.

In the case where the window area of only a changed picture portion is received and expanded, the window position arbitrarily moves to the changed portion on the picture. In this case, therefore, the window area position generation unit 38 receives position information and generates position information for sticking.

According to the window area position information generated by the window area position generation unit 38, the window fitting display unit 39 stores the window area subjected to dynamic image expansion in the window area expansion unit 37 in a frame memory area of the window fitting display unit 39. Even in the case where only the window of the changed picture portion is expanded and updated, the window fitting display unit 39 can refer to the whole high resolution picture (by scrolling, if necessary).

Fourth Embodiment

By using as many windows as corresponding to the number of a window and a window movement pattern corresponding to the whole picture, compressed data resulting from application of the above described dynamic image compression method are obtained. Even in the case where the above described expansion method is applied on the reception side from the middle of the compressed data, the present embodiment aims at preventing a trouble such as disorder of the expanded picture.

In a dynamic image compression and expansion method intended for a natural video image put to practical use in a wide field, there is adopted a means for effecting highly efficient compression by detecting a motion of a pixel set included in an image between consecutive dynamic images. If a motion in the image can be extracted between consecutive dynamic images, many portions in the latter dynamic image picture can be catered for by reusing the former dynamic image picture.

Data compressed by using the above described dynamic image compression and expansion method are associated and compressed between a plurality of dynamic images. In the case where the compressed data are expanded by using the above described expansion method, therefore, a trouble such as disorder of the expanded picture occurs provided that the expansion is effected from the middle of a plurality of associated dynamic images.

In the above described dynamic image compression and expansion method, therefore, a trouble such as disorder of the expanded picture is prevented from occurring by handling a result of window area compression corresponding to one high resolution picture as one group, effecting control so as not to cause correlation or association between groups of compression results, and handling this group as the unit on the expansion side as well.

Furthermore, the window area collected and compressed as a group may extend over a plurality of pictures or windows less than one picture, so long as the windows have a continuously overlapping area. According to a pattern for moving the window over the picture, the number of grouped compressed window areas is successively changed over.

Figure 11:
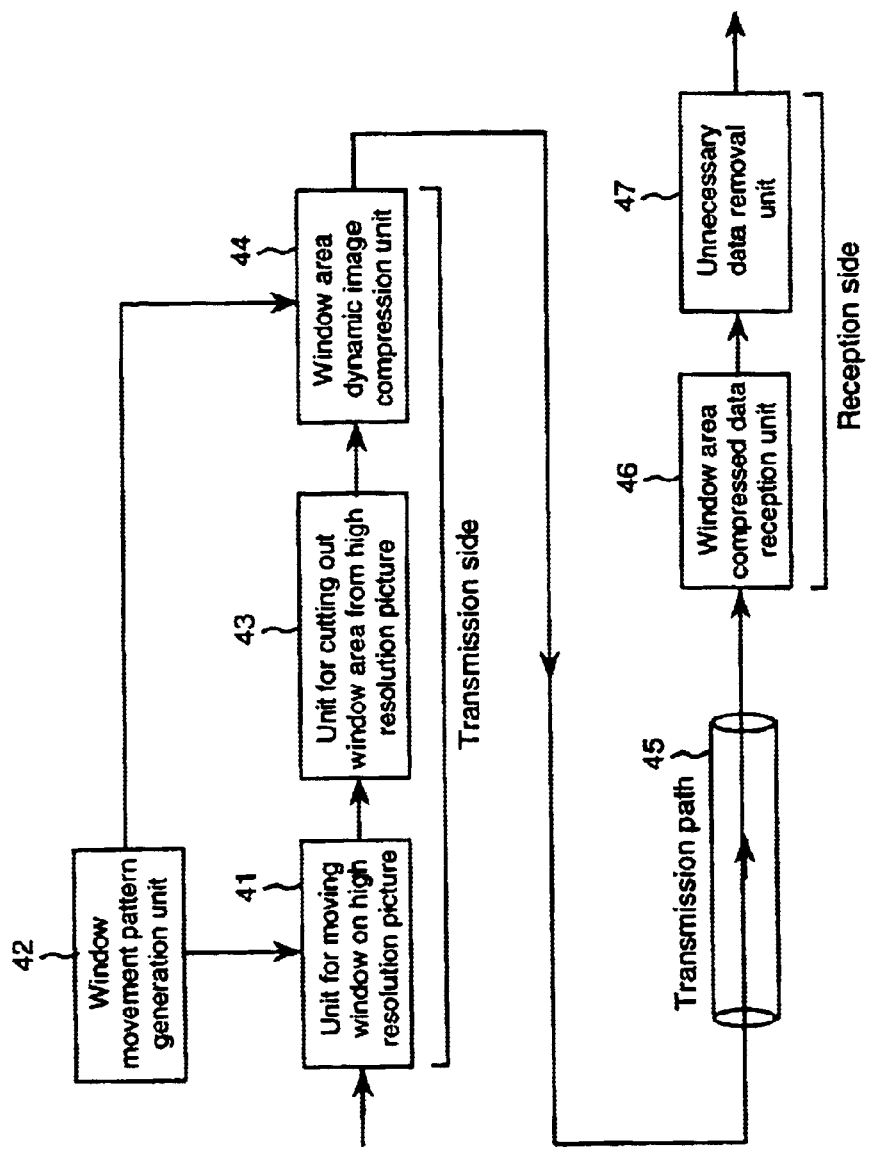
FIG. 11 is a block diagram showing a fourth embodiment.

FIG. 11 shows a block diagram for description of the present embodiment. It is assumed that a computer picture is processed as the high resolution picture in the description of the present embodiment. In the same way as the first method shown in FIG. 4(a), a unit 41 for moving window on high resolution picture arranges windows from the left end to the right end on a picture (hereafter a computer picture is simply referred to as picture) so that the windows overlap each other in a defined fixed area.

When the window arrives at the right end, the window is shifted in a vertical direction by a longitudinal dimension of the window. From the left end, the movement is started again. The window movement over the picture is conducted repeatedly until the window moves over the whole picture.

Furthermore, if the window is moved in the computer picture while being folded in the same way as the second movement method shown in FIG. 4(b), the window pictures corresponding to the whole picture become an artificial dynamic image.

Each window movement on the picture is repeated at a defined rate (for example, at a rate of 30 times per second). The window is moved on the picture. A window acquired by window cutout conducted by a unit 43 for cutting out window area from high resolution picture is subjected to dynamic image compression in a window area dynamic image compression unit 44.

Here, the window movement on the picture conducted by the unit 41 for moving window on high resolution picture is controlled by a window movement pattern generation unit 42. The window movement pattern generation unit 42 orders the unit 41 for moving window in high resolution picture to move the window on the picture. In addition, the window movement pattern generation unit 42 informs the window area dynamic image compression unit 44 of the number of compressed window areas of one group optimized in the currently selected window movement pattern.

In the present embodiment, therefore, a trouble such as disorder of the expanded picture is prevented from occurring by handling a row of window areas forming an artificial dynamic image while taking a group as the unit, making an adjustment so as not to cause correlation or association between groups, and applying an expansion method while taking a group as the unit in the same way on the reception side.

On the reception side, compressed data of the window area transmitted via a transmission path 45 is received by a window area compressed data reception unit 46, and outputted to an unnecessary data removal unit 47. If the received compressed data does not begin from the head of a group unit, the unnecessary data removal unit 47 discards received data as far as the head of a group unit.

As a result, a trouble caused by effecting the expansion from the middle of a plurality of associated dynamic images can be avoided, and disorder of the expanded picture can be prevented.

Fifth Embodiment

A fifth embodiment of the present invention will now be described. In the present embodiment, the dynamic image compression and expansion method and its environment are utilized as they are as described above. In addition, a composition means for composing the window position information and the like cut out from the picture directly with the video image as cryptograph information (video image) is provided.

Ideally, in a picture obtained by combining a transferred window area with an information picture, it is necessary to make composite information unrecognizable in human eyesight. In order that the information picture combined with the transferred window area can be suitably extracted by image processing after the reception and expansion, the dynamic image compression side in the present embodiment informs the expansion side of the window position information and other management information (such as a password for picture display) without modifying the above described dynamic image compression and expansion method, transmission and reception method for communication, and its environment at all.

Figure 12:
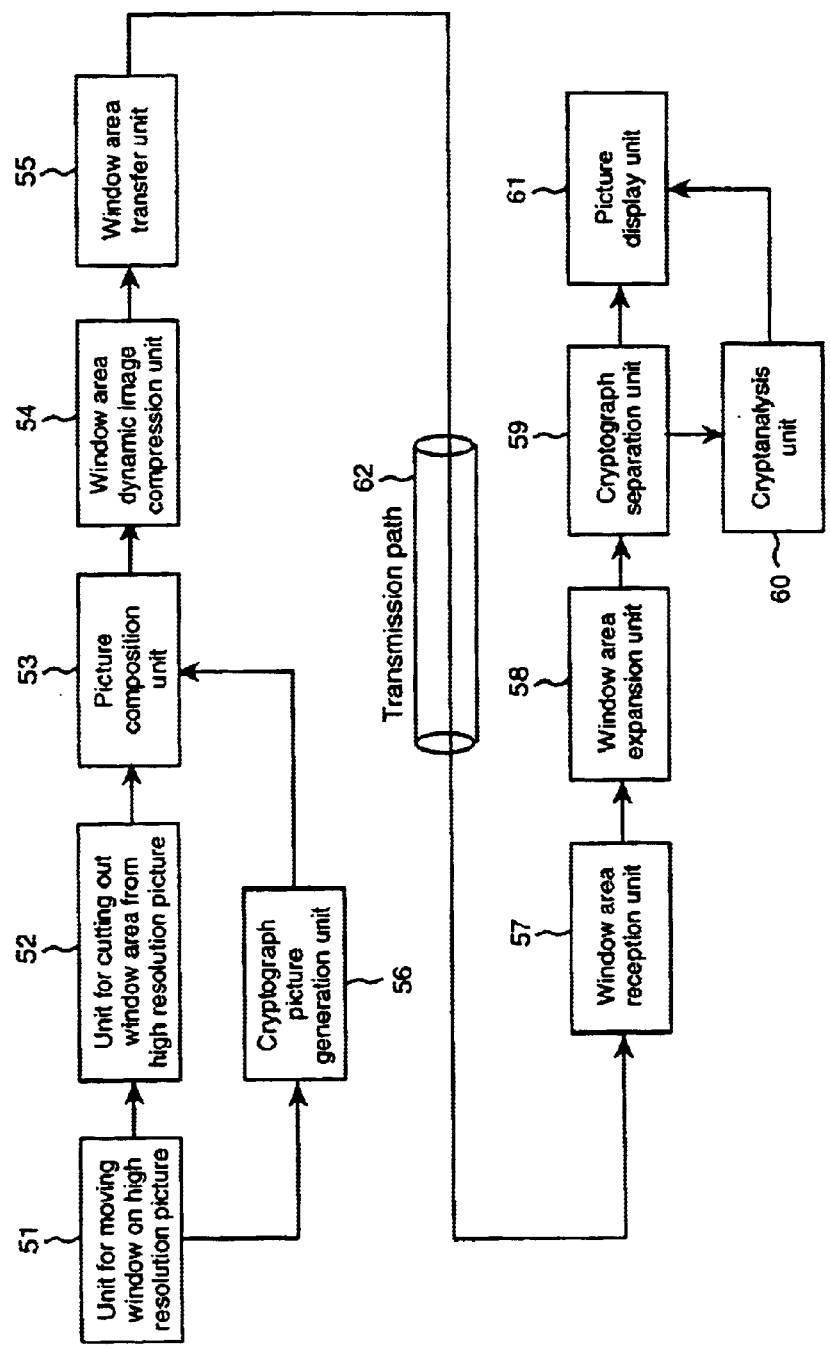
FIG. 12 is a block diagram showing a fifth embodiment.

FIG. 12 shows a block diagram of an image processing apparatus of the present embodiment. It is assumed that the high resolution picture is a computer picture in description of the present embodiment. Window movement on the computer picture is conducted by a unit 51 for moving window on high resolution picture. As for the moving method, the above described various methods can be utilized.

Upon movement of the window on the picture, the picture in the window is cut out by a unit 52 for cutting out window area from high resolution picture. The image thus cut out is subjected to compression processing in a dynamic image compression unit 54, and transferred to the reception side via a transmission path 62 by a window area transfer unit 55.

With respect to an artificial dynamic image formed by an image cut out with the window, a cryptograph picture generated by a cryptograph picture generation unit 56 is subjected to image processing in a picture composition unit 53. In the present embodiment, image data and cryptograph data are combined.

On the reception side, data obtained by compressing an artificial dynamic image formed of the cut out image is received by a window area reception unit 57, and outputted to a window area expansion unit 58. In the window area expansion unit 58, the above described dynamic image expansion method is applied. A picture of a window area of each position on the picture is thus outputted to a cryptograph picture separation unit 59.

The cryptograph picture separation unit 59 separates cryptograph data from a window area picture of each position on the picture outputted from the window area expansion unit 58, and outputs the cryptograph data to a cryptanalysis unit 60. In addition, the cryptograph picture separation unit 59 outputs the window area picture after separation of the cryptograph data to a picture display unit 61.

By referring to decrypted information from the cryptanalysis unit 60, the picture display unit 61 fits the window area picture outputted from the cryptograph picture separation unit 59 to the high resolution picture and displays the result.

Figure 13:
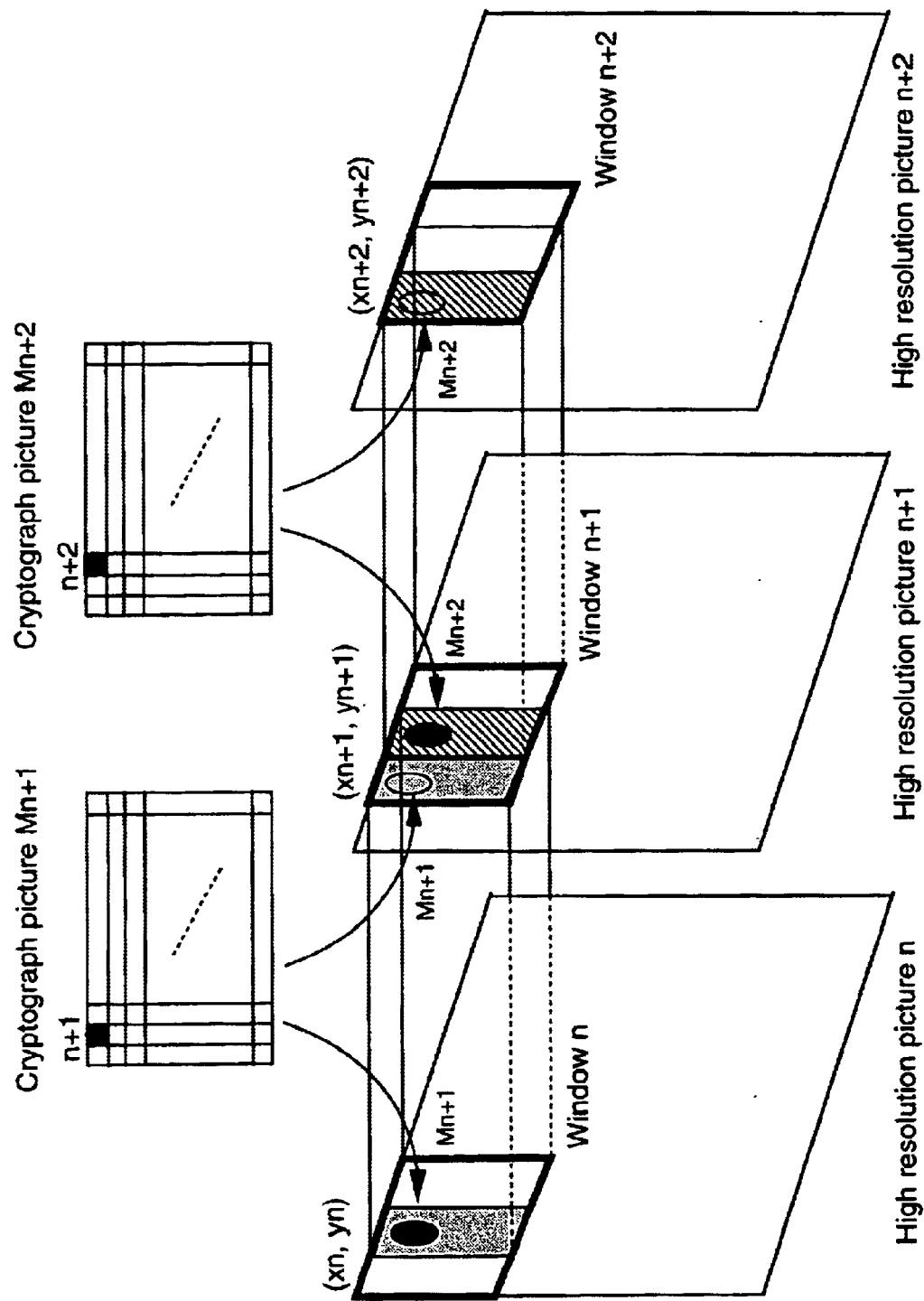
FIG. 13 a diagram for description as to how window position information is composed.

For example, by the following method, the cryptograph picture is combined with the window cut out. For each of pictures (high resolution pictures) n, n+1, n+2, . . . , the window position is moved at a defined interval so as to cause an overlap portion in a window n and a window n+1 as shown in FIG. 13.

As for the window n and the window n+1, an overlap area (shaded area) exists only between adjacent windows. When the window area is expanded, assigned to the high resolution picture, and reconstructed, this shaded area is assigned by the window n+1 so as to overlap, and displayed.

For example, a cryptograph picture Mn+1 is combined with the n window area M of the shaded area. The cryptograph picture combined in a fixed position M of the shaded area of the window n is instantly overwrite-displayed as an artificial dynamic image by the window n+1, and is hard to be recognized in human eyesight. Furthermore, by applying the cryptograph picture to a color difference picture used in the above described dynamic image compression and expansion method, this effect is improved.

In the case where there is no change in an overlap area (shaded area) between adjacent windows of the window n and the window n+1, the cryptograph picture can be taken out easily by deriving the difference on the reception side. Furthermore, assuming that there is a cryptograph picture (area) in a specific position of the shaded area in the window n, image processing for extracting it is effected.

For example, as shown in FIG. 13, the cryptograph picture has a lengthwise and breadthwise pixel arrangement structure corresponding to window positions on the picture. One pixel indicates one window position on the picture. The cryptograph picture is a picture showing cutout window position (such a picture that display coordinate positions can be extracted by image processing) and value added information such as a password for displaying a transmission window picture.

By using a predetermined window movement method, the window is first moved over the whole picture. Composition of the cryptograph picture and compression processing (compression and transfer) are repeated. Thereafter, a changed portion is determined on the basis of a parameter linked to a motion. The window position is moved to the changed portion on the picture. Such a method is executed.

Furthermore, if a changed portion on the picture disappears, the window movement is returned to the initial whole picture movement. It is also possible to always move the window according to a defined window movement pattern, and repeat the composition of the cryptograph picture and compression processing (compression and transfer).

By the way, in the above described embodiment, such an example that one window is moved on the high resolution picture has been shown. Alternatively, a plurality of windows may be moved. In this case, a plurality of windows are moved on the high resolution picture at a defined window size and a defined distance interval so that adjacent window areas will overlap each other. A plurality of window areas are cut out and arranged. As a result, an artificial dynamic image is obtained. The artificial dynamic image is compressed by using the standardized dynamic image compression method, and transferred via a communication and transmission path.

Furthermore, one or more windows are moved on the high resolution picture at a defined window size and a defined distance interval so that adjacent window areas will overlap each other. One or more window areas are cut out and arranged. As a result, artificial dynamic images are obtained. The artificial dynamic images are transmitted in order agreed beforehand by the transmission side and the reception side, or transmitted by adding sequence information to the window data to be transmitted. As a result, they are reproduced as window areas in predetermined positions on the reception side. If a plurality of windows are moved as described above, the case where the high resolution picture is large can be coped with favorably.

Sixth Embodiment

A sixth embodiment of the present invention will now be described. In the above described embodiments, a window is displayed and moved on a large image to be transmitted or stored. By cutting out images of areas defined by the window, an artificial dynamic image is generated. Such an example has been described.

In the present embodiment, when generating a large image to be transmitted or stored, a window is displayed on the large image. An image similar to the case where the window is moved is generated. As a result, an artificial dynamic image similar to that described in detail with reference to the above described embodiments is generated.

Figure 14:
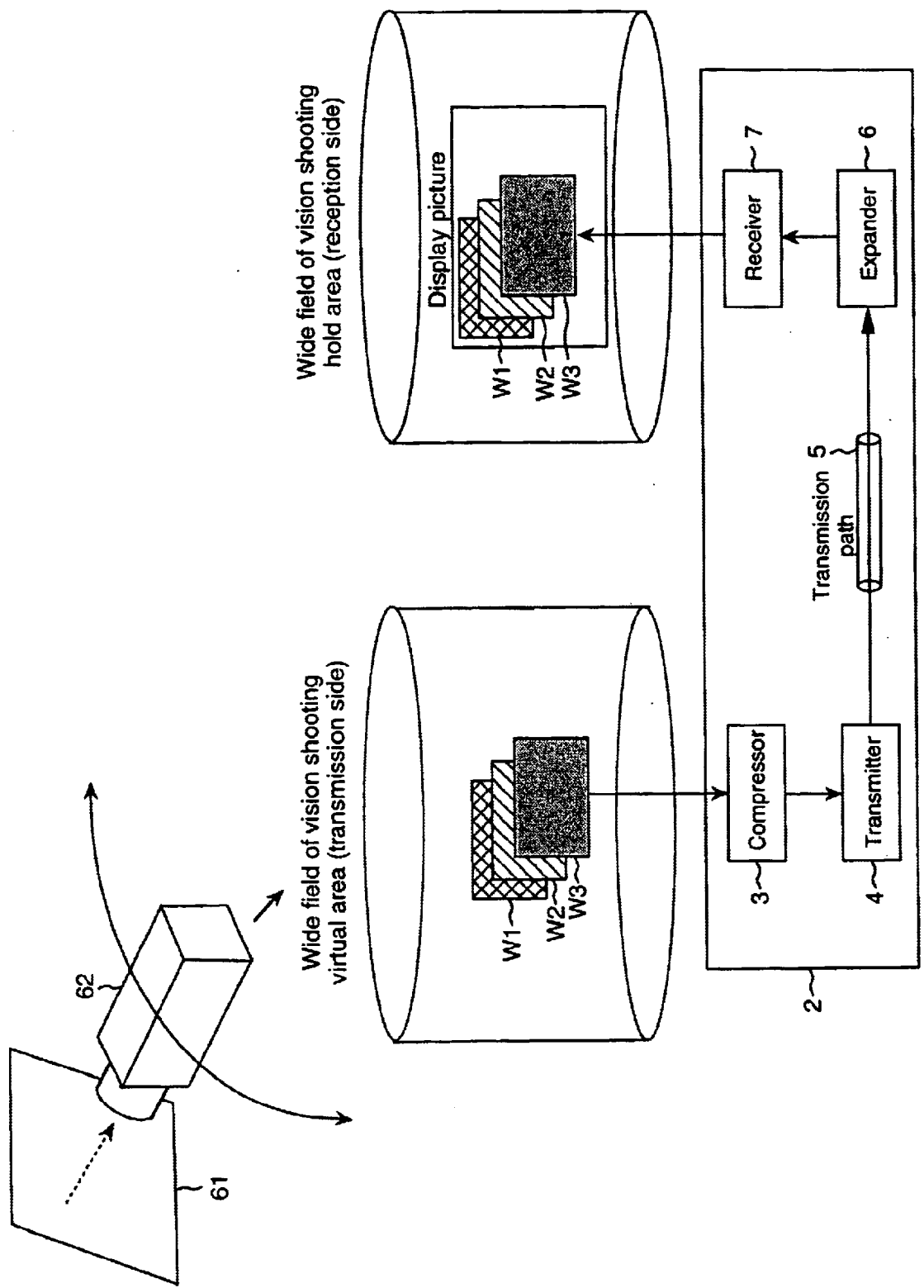
FIG. 14 is a diagram for description of an example of application to a wide area shooting camera.

Hereafter, a concrete example will be described by referring to FIG. 14. In FIG. 14, numeral 61 denotes a subject forming a large image to be transmitted or stored. The subject 61 is shot by a camera 62.

Although a rectangular subject 61 is shown in FIG. 14, the camera 62 is formed so as to be able to shoot over 360° direction.

In the case where the subject 61 is shot by the camera 62, it is conducted while moving the optical axis of the camera 62. An image obtained by shooting once is similar to an image cut out by the window in the above described embodiments.

By using a method similar to the above described method of moving the window, the panning mechanism and the tilt mechanism of the camera 62 are controlled. While causing overlapping in a predetermined area, the whole area of the subject 61 is shot.

As for concrete examples to which the technique of the present embodiment is applied, for example, security video images and television conference video images can be mentioned. In such a case, it is necessary to shoot an area of a wide field of vision. In the shot video image having a wide area where almost portions of the shot subject can be handled as a still picture and a narrow area which changes frequently, the still picture portion is handled as an artificial dynamic image, whereas the changed area is handled as a dynamic image. As a result, the present embodiment is standardized and put to practical use in a wide field. The above described dynamic image compression and expansion method is utilized as it is. While making the most of its characteristic, it can be handled synthetically.

The shooting camera 62 should be such a camera that the shooting position can be controlled, in order to shoot a wide field of vision. On the transmission side, the camera shooting direction is controlled so as to shoot a camera shooting area which is a part of a wide camera shootable area. The camera movement distance interval is so adjusted so that adjacent camera shooting areas will overlap each other. On the reception side, this area of wide field of vision is expanded and held. On a limited observation picture, the area of the wide field of vision can be observed by scrolling.

Other Embodiments of the Present Invention

The present invention may be applied to a system composed of a plurality of devices (such as a host computer, an interface device, a reader, and a printer), or it may be applied to an apparatus composed of one device.

In order to activate various devices so as to implement the function of the above described embodiments, a program code of software for implementing the function of the above described embodiments is supplied to a computer included in the apparatus or system connected to various devices. In accordance with a program stored in the computer (CPU or MPU) of the system or apparatus, the various devices are activated.

Such an embodiment is also included in the category of the present invention.

Furthermore, in this case, the program code itself of the software implements the function of the above described embodiments. The program code itself, and a means for supplying the program code to the computer, such as a storage medium storing such a program code forms the present invention. As the storage medium for storing such a program code, for example, a floppy disk, a hard disk, an optical disk, an optical magnetic disk, a CD-ROM, magnetic tape, a non-volatile memory card, or a ROM can be used.

Not only in the case where the function of the above described embodiments is implemented by execution of the program code supplied to the computer, but also in the case where the function of the above described embodiments is implemented by cooperation of the program with an OS (operating system) or other application software operating in the computer, it is a matter of course that such a program code is included in the embodiments of the present invention.

After the supplied program code is stored in a memory included in a function extension board of the computer or a function extension unit connected to the computer, a CPU or the like included in the function extension board or the function extension unit conducts a part or the whole of the actual processing. It is a matter of course that the case where the function of the above described embodiments is implemented by such processing is included in the present invention.

Industrial Applicability

As described above, the present invention includes setting a window smaller than the picture in a high resolution picture, moving the window thus set at such a predetermined interval that an area in which the window and at least an adjacent window overlap each other exists, cutting out an image of an area defined by the window, whenever the window is moved, and generating a large picture by conducting dynamic image processing on images thus cut out.

Therefore, it is possible to efficiently transfer or store high resolution pictures each having a larger size than a video size which is the subject of the environment standardized and put in good condition of utilization facilities, by making the most of the utilization environment of the dynamic image compression and expansion standardized and put to practical use.

Furthermore, in accordance with a feature of an image transfer system of the present invention, a change component caused by window movement is canceled in an overlap area between adjacent windows. In the case where a parameter linked to the extracted change of the window is larger than a defined threshold value, it is judged that there is a change in the window on the picture. Only the changed portion on the picture is cut out by the window area, and compressed and transferred. As a result, the amount of transfer can be reduced. Furthermore, on the reception side, it is not always necessary to receive and expand information of the whole picture in order to observe the whole picture, and consequently the load can be lightened. In addition, although the reception side expands and update only the changed picture portion in most times, the whole of the high resolution picture can be referred to.

Furthermore, in accordance with another feature of an image transfer system of the present invention, even in the case where the reception side has a standard resolution picture and cannot hold a high resolution picture, only the required partial area cut out by the window area on the high resolution picture can be observable.

Furthermore, in accordance with another feature of an image transfer system of the present invention, even if communication of the window position information from the transmission side to the reception side is omitted, the window area can be assigned suitably on the picture area of the reception side.

What is claimed is:

1. A high resolution high value added video processing apparatus comprising:
    a window setting means for setting a window in a high resolution picture, said window being smaller than the picture;
    a window moving means for moving the window set by said window setting means at such a predetermined interval that an area in said window and at least an adjacent window overlap each other;
    an image cutout means for cutting out an image of an area defined by said window, whenever said window is moved; and
    a picture generation means for generating a large picture by conducting dynamic image processing on images cut out by said image cutout means.

2. A storage medium comprising a program for causing a computer to function is stored as each of means stated in claim 1.

3. A high resolution high value added video processing apparatus for cutting out an image of an area defined by a window from a high resolution picture, and conducting dynamic image compression, transfer and expansion on said cut out image comprising:
    a window moving means for moving said window at such a predetermined interval that an area in said window and at least an adjacent window overlap each other;
    an image cutout means for cutting out an image of an area defined by said window, in a position where said window has moved;
    a picture generation means for generating a large picture by conducting dynamic image processing on images cut out by said image cutout means;
    a changed portion detection means for detecting a changed portion included in said high resolution picture;
    a window moving means for moving the window to a changed portion included in said high resolution picture and detected by said changed portion detection means; and
    a moving control means for exercising control so as to cause the movement of said window to become movement over a whole picture area, when a changed portion has not been detected in said high resolution picture by said changed portion detection means, or at fixed defined periods.

4. A high resolution high value added video processing apparatus according to claim 3, wherein said changed portion detection means detects a changed portion by extracting a parameter linked to a picture change as regards to an overlap area of adjacent windows.

5. A high resolution high value added video processing method comprising:
    window setting processing for setting a window in a high resolution picture, said window being smaller than the picture;
    window moving processing for moving the window set by said window setting processing at such a predetermined interval that an area in said window and at least an adjacent window overlaps each other;
    image cutout processing for cutting out an image of an area defined by said window, whenever said window is moved; and
    picture generation processing for generating a large picture by conducting dynamic image processing on images cut out by said image cutout processing.

6. A storage medium comprising steps included in the method stated in claim 5 are stored so as to be readable from a computer.

7. A high resolution high value added video processing method for cutting out an image of an area defined by a window from a high resolution picture, and conducting dynamic image compression, transfer and expansion on said cut out image, comprising:
    window moving processing for moving said window at such a predetermined interval that an area in which said window and at least an adjacent window overlap each other;
    image cutout processing for cutting out an image of an area defined by said window, in a position where said window has moved;
    picture generation processing for generating a large picture by conducting dynamic image processing on images cut out by said image cutout processing;
    changed portion detection processing for detecting a changed portion included in said high resolution picture;
    window moving processing for moving the window to a changed portion included in said high resolution picture and detected by said changed portion detection processing; and
    moving control processing for exercising control to cause the movement of said window to become movement over a whole picture area, when a changed portion has not been detected in said high resolution picture by said changed portion detection processing, or at fixed defined periods.

8. A high resolution high value added video processing method according to claim 7, wherein said changed portion detection processing is conducted by extracting a parameter linked to a picture change as regards an overlap area between adjacent windows.

9. A high resolution high value added video transfer system for cutting out an image of an area defined by a window from a high resolution picture, and conducting dynamic image compression, transfer and expansion on said cut out image, comprising a transmission side including: a window moving means for moving said window at such a predetermined interval that an area in said window and at least an adjacent window overlap each other;

an image cutout means for cutting out an image of an area defined by said window, in a position where said window has moved;

a picture generation means for generating a large picture by conducting dynamic image processing on images cut out by said image cutout means;

a changed portion detection means for detecting a changed portion included in said high resolution picture;

a window moving means for moving the window to a changed portion included in said high resolution picture and detected by said changed portion detection means; and a moving control means for exercising control to cause the movement of said window to become movement over a whole picture area, when a changed portion has not been detected in said high resolution picture by said changed portion detection means, and a reception side including a picture reconstruction means for receiving and expanding a compressed result of an image of a whole picture area cut out in a window movement position and reconstructing it as a high resolution picture in case said reception side has a high resolution picture display means, and for receiving and expanding a compressed result of an image of a window area obtained by cutting out a partial changed area in the picture or a specified window area in the picture and reconstructing it as a standard resolution picture in case said reception side has only a standard resolution picture display means.

10. A high resolution high value added video transfer system according to claim 9, wherein when moving the window over the whole picture area of said high resolution picture and cutting out an image in the window area, a pattern of said window movement is fixedly defined.

11. A high resolution high value added video transfer system according to claim 9, wherein with an overlap portion of an image within each window area cut out by moving the window on said high resolution picture while causing overlap, control information containing at least position information of said cutout window, and cryptograph information are combined, and the control information and the cryptograph information are made unrecognizable in human eyesight.

12. A high resolution high value added video transfer system according to claim 9, wherein the transmission side comprises: a first compression and transfer means for cutting out images of areas defined by said window corresponding to the whole picture area, generating an artificial dynamic image, and compressing and transferring said artificial dynamic image; and a second compression and transfer means for defining and cutting out only a changed portion in said high resolution picture by using said window, generating an artificial dynamic image, and compressing and transferring the artificial dynamic image, and the reception side comprises:

a high resolution picture generation means for receiving and expanding high resolution picture data corresponding to the whole picture area transferred from said first compression and transfer means and generating a high resolution picture;

a storage means for holding high resolution picture data generated by said high resolution picture generation means; and an image data update means for replacing image data of a corresponding portion in image data stored in said storage means with image data of a changed portion in said high resolution picture transferred from said second compression and transfer means and thus conducting update.

13. A storage medium comprising a program for causing a computer to function is stored as each of means stated in claim 9.

14. A high resolution high value added video transfer method for cutting out an image of an area defined by a window from a high resolution picture, and conducting dynamic image compression, transfer and expansion on said cut out image, and a transmission side comprising the steps of:

window moving processing for moving said window at such a predetermined interval that an area in said window and at least an adjacent window overlap each other;

image cutout processing for cutting out an image of an area defined by said window, in a position where said window has moved;

picture generation processing for generating a large picture by conducting dynamic image processing on images cut out by said image cutout processing;

changed portion detection processing for detecting a changed portion included in said high resolution picture;

window moving processing for moving the window to a changed portion included in said high resolution picture and detected by said changed portion detection processing; and moving control processing for exercising control to cause the movement of said window to become movement over a whole picture area, when a changed portion has not been detected in said high resolution picture by said changed portion detection processing, or at fixed defined periods, and a reception side comprises steps of picture reconstruction processing for receiving and expanding a compressed result of an image of a whole picture area cut out in a window movement position and reconstructing it as a high resolution picture in case said reception side has a high resolution picture display means, and for receiving and expanding a compressed result of an image of a window area obtained by cutting out a partial changed area in the picture or a specified window area in the picture and reconstructing it as standard resolution picture in case said reception side has only a standard resolution picture display means.

15. A high resolution high value added video transfer method according to claim 14, wherein when moving the window over the whole picture area of said high resolution picture and cutting out an image in the window area, a pattern of said window movement is fixedly defined.

16. A high resolution high value added video transfer method according to claim 14, wherein with an overlap portion of an image within each window area cut out by moving the window on said high resolution picture while causing overlap, control information containing at least position information of said cutout window, and cryptograph information are combined, and the control information and the cryptograph information are made unrecognizable in human eyesight.

17. A high resolution high value added video transfer method according to claim 15, wherein the transmission side conducts: first compression and transfer processing for cutting out images of areas defined by said window corresponding to the whole picture area, generating an artificial dynamic image, and compressing and transferring said artificial dynamic image; and second compression and transfer processing for defining and cutting out only a changed portion in said high resolution picture by using said window, generating an artificial dynamic image, and compressing and transferring the artificial dynamic image, and the reception side conducts:

high resolution picture generation processing for receiving and expanding high resolution picture data corresponding to the whole picture area transferred by said first compression and transfer processing and generating a high resolution picture;

storage processing for holding high resolution picture data generated by said high resolution picture generation processing; and image data update processing for updating image data stored by said storage processing with image data of a changed portion in said high resolution picture transferred by said second compression and transfer processing.

18. A storage medium comprising steps included in the method stated in claim 14 are stored so as to be readable from a computer.

19. A high resolution high value added video processing apparatus, comprising: a shooting means for shooting a plurality of unit images forming a part of a large image to be formed;

a control means for controlling operation of said shooting means in a panning direction and a tilt direction so that a plurality of images shot by said shooting means will respectively have overlap areas; and a picture generation means for conducting dynamic image processing on the plurality of images shot by said shooting means and generating a large picture.

20. A storage medium comprising a program for causing a computer to function is stored as each of means stated in claim 19.

21. A high resolution high value added video processing method, comprising: shooting processing for shooting a plurality of unit images forming a part of a large image to be formed;

control processing for controlling operation of said shooting processing in a panning direction and a tilt direction so that a plurality of images shot by said shooting processing will respectively have overlap areas; and picture generation processing for conducting dynamic image processing on the plurality of images shot by said shooting processing and generating a large picture.

22. A storage medium comprising steps included in the method stated in claim 21 are stored so as to be readable from a computer.

\* \* \* \* \*